(12) United States Patent
Yokota

(10) Patent No.: US 12,335,109 B2
(45) Date of Patent: Jun. 17, 2025

(54) INFORMATION PROCESSING DEVICE, INFORMATION PROCESSING SYSTEM, INFORMATION PROCESSING METHOD, AND PROGRAM

(71) Applicant: NEC Corporation, Tokyo (JP)

(72) Inventor: Tomohisa Yokota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/268,060

(22) PCT Filed: Mar. 25, 2021

(86) PCT No.: PCT/JP2021/012604
§ 371 (c)(1),
(2) Date: Jun. 16, 2023

(87) PCT Pub. No.: WO2022/201445
PCT Pub. Date: Sep. 29, 2022

(65) Prior Publication Data
US 2024/0039805 A1   Feb. 1, 2024

(51) Int. Cl.
| | | |
|---|---|---|
| *G06F 16/23* | (2019.01) | |
| *H04L 9/00* | (2022.01) | |
| *H04L 41/5003* | (2022.01) | |
| *G06C 5/00* | (2006.01) | |
| *G06C 5/02* | (2006.01) | |

(52) U.S. Cl.
CPC ............ *H04L 41/5003* (2013.01); *H04L 9/50* (2022.05)

(58) Field of Classification Search
CPC ......... H04L 41/5003; H04L 9/50; G06C 5/00; G06C 5/02; G06C 5/08; G06F 16/23

USPC ......................................................... 709/224
See application file for complete search history.

(56) References Cited

U.S. PATENT DOCUMENTS

| | | | |
|---|---|---|---|
| 10,764,160 B1 | 9/2020 | Shtrauch et al. | |
| 11,269,859 B1* | 3/2022 | Luedtke | G06F 16/245 |
| 11,507,562 B1* | 11/2022 | Luedtke | H04L 9/50 |
| 2018/0375750 A1 | 12/2018 | Mueller | |
| 2019/0173854 A1 | 6/2019 | Beck | |
| 2019/0213289 A1* | 7/2019 | Baeckler | G06F 30/343 |
| 2020/0057860 A1 | 2/2020 | Patil et al. | |
| 2020/0126321 A1* | 4/2020 | Swearingen | G06Q 30/0281 |

(Continued)

FOREIGN PATENT DOCUMENTS

| | | |
|---|---|---|
| JP | 2019-9772 A | 1/2019 |
| JP | 2020-107203 A | 7/2020 |
| JP | 2020-113280 A | 7/2020 |

OTHER PUBLICATIONS

International Search Report for PCT Application No. PCT/JP2021/012604, mailed on Jun. 8, 2021.

*Primary Examiner* — Jude Jean Gilles
(74) *Attorney, Agent, or Firm* — Sughrue Mion, PLLC

(57) ABSTRACT

Provided is a technique that allows persons concerned with provision of a service to share information pertaining to a communication infrastructure which has been used to provide the service. An information processing apparatus includes: an acquisition means that acquires log information of one or more communication infrastructures which constitute an end-to-end communication path; and a generation means that generates transaction data which includes the log information and which is to be added to a block chain updated using a predetermined consensus algorithm.

8 Claims, 18 Drawing Sheets

(56) References Cited

U.S. PATENT DOCUMENTS

| | | |
|---|---|---|
| 2020/0204580 A1 | 6/2020 | Konda et al. |
| 2020/0225649 A1 | 7/2020 | Cahill |
| 2021/0051019 A1* | 2/2021 | Hyde .................... H04L 9/3239 |
| 2021/0103581 A1* | 4/2021 | Lee ..................... G06F 16/2365 |
| 2021/0357927 A1* | 11/2021 | Kita ................. G06Q 20/38215 |
| 2022/0101326 A1* | 3/2022 | Kim ................... G06Q 20/4016 |

* cited by examiner

INFORMATION PROCESSING DEVICE, INFORMATION PROCESSING SYSTEM, INFORMATION PROCESSING METHOD, AND PROGRAM

This application is a National Stage Entry of PCT/JP2021/012604 filed on Mar. 25, 2021, the contents of all of which are incorporated herein by reference, in their entirety.

TECHNICAL FIELD

The present invention relates to an information processing apparatus, an information processing system, an information processing method, and a program.

BACKGROUND ART

The introduction of 5G using the latest technology has made it possible to provide, on the network side, functions such as large capacity, low delay, and multiple connections. Along with the circumstances, services that are more highly dependent on communication infrastructures are becoming increasingly popular. Moreover, it is predictable that problems in terms of security and safety and problems of responsibility demarcation, assurance, and compensation would arise in relation to such circumstances. For example, the following demand can be conceived in regard to drones that fly using a wireless technology such as 5G and an accompanying communication network. That is, if a defect has occurred due to the communication network, it would be demanded to separate, end-to-end, where the problem has occurred and who is responsible for assurance and compensation, between (i) a provider of a transportation service using the drone, (ii) a telecommunications carrier providing the network, and (iii) an apparatus manufacturer which has manufactured the drone.

Under the present circumstances, log information of a communication infrastructure such as a communication apparatus and a communication path is stored and managed in a server which is managed by a telecommunications carrier with use of, for example, techniques such as SNMP, Telemetry, packet capture, and NetFlow.

Patent Literature 1 discloses a method of tracking information pertaining to a device in a network. The method includes: receiving, at a first gateway, a plurality of communications that each include information indicating a state of one of a plurality of devices; grouping, at the first gateway, pieces of information from two or more of the plurality of communications into a single transaction record which includes a hash of a previous transaction record pertaining to a network; and sending the single transaction record from the first gateway to a server.

CITATION LIST

Patent Literature

[Patent Literature 1]
Japanese Patent Application Publication, Tokukai, No. 2019-9772

SUMMARY OF INVENTION

Technical Problem

The method disclosed in Patent Literature 1 can realize collection, tracking, and recording of a state of a device even on different types of networks. However, the method cannot meet the foregoing demand that may occur in communication infrastructures.

In order to solve the foregoing problem, there is a need for a technique that allows persons concerned with provision of a service to share information pertaining to a communication infrastructure which has been used to provide the service.

An aspect of the present invention is to provide a technique that allows persons concerned with provision of a service to share information pertaining to a communication infrastructure which has been used to provide the service.

Solution to Problem

An information processing apparatus in accordance with an aspect of the present invention includes at least one processor, the at least one processor carrying out: an acquisition process of acquiring log information of one or more communication infrastructures which constitute an end-to-end communication path; and a generation process of generating transaction data which includes the log information and which is to be added to a block chain updated using a predetermined consensus algorithm.

An information processing method in accordance with an aspect of the present invention includes: acquiring, by at least one processor, log information of one or more communication infrastructures which constitute an end-to-end communication path; and generating, by the at least one processor, transaction data which includes the log information and which is to be added to a block chain updated using a predetermined consensus algorithm.

A storage medium in accordance with an aspect of the present invention is a computer-readable non-transitory storage medium storing a program for causing a computer to function as: an acquisition means that acquires log information of one or more communication infrastructures which constitute an end-to-end communication path; and a generation means that generates transaction data which includes the log information and which is to be added to a block chain updated using a predetermined consensus algorithm.

Advantageous Effects of Invention

According to an aspect of the present invention, it is possible to provide a technique that allows persons concerned with provision of a service to share information pertaining to a communication infrastructure which has been used to provide the service.

EXAMPLE EMBODIMENTS

First Example Embodiment

Figure 1:
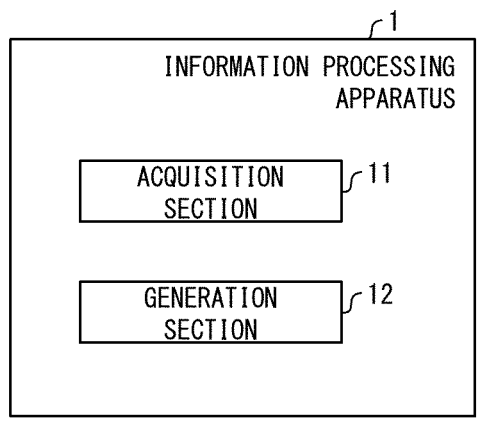
FIG. 1 is a block diagram illustrating a configuration of an information processing apparatus 1 according to a first example embodiment of the present invention.

The following description will discuss a first example embodiment of the present invention in detail with reference to the drawings. The present example embodiment is a basic form of example embodiments described later. FIG. 1 is a block diagram illustrating a configuration of an information processing apparatus 1 according to the first example embodiment.
(Configuration of Information Processing Apparatus 1)

As illustrated in FIG. 1, the information processing apparatus 1 includes an acquisition section 11 and a generation section 12. The acquisition section 11 acquires log information of one or more communication infrastructures that constitute an end-to-end communication path. The generation section 12 generates transaction data which includes the log information and which is to be added to a block chain updated using a predetermined consensus algorithm. The acquisition section 11 is an aspect of the "acquisition means" recited in claims, and the generation section 12 is an aspect of the "generation means" recited in claims.

In the present example embodiment, the communication infrastructure refers to a communication apparatus and a communication path that are owned by a telecommunications carrier which establishes a communication network. There are one or more telecommunications carriers which establish communication networks, and each of the telecommunications carriers has its own communication infrastructure. End users such as a provider of a service using a communication network, a user of the service, an administrator of one or more communications businesses, and a supervisor of the communications business or service are connected to each other via the communication network. Each of communication apparatuses included in the communication network is referred to also as a node. The communication path is a path for connecting an end user terminal to a node, and a path for connecting a node to another node. One end user terminal can communicate with another end user terminal via communication apparatuses (nodes) and communication paths owned by one or more telecommunications carriers. In the present example embodiment, the service using a communication network is, for example, a goods transportation service using a drone. In this case, a provider the service controls the drone via the communication network to carry out the goods transportation. A user of the service can use the goods transportation service using the drone. In this case, each end user is a member of persons concerned with provision of the service, and is referred to also as a stakeholder.

In the present example embodiment, log information is (i) information pertaining to transaction between a user of a service and a provider of the service (content, condition, and the like of the service) and (ii) information pertaining to communication used to provide the service. The log information includes information pertaining to a communication apparatus and a communication path which are owned by a telecommunications carrier. The log information may include a time at which the communication service was used. Hereinafter, information pertaining to a communication apparatus is referred to also as communication apparatus information. Moreover, information pertaining to a communication path is referred to also as communication path information. The communication apparatus information and communication path information are collectively referred to also as communication-related information.

In the present example embodiment, the transaction data is (i) information pertaining to transaction between a user of a service and a provider of the service and (ii) information pertaining to provision of the service. In particular, the transaction data in the present example embodiment is transaction data which is added to a block chain that is updated using a predetermined consensus algorithm. The transaction data includes the log information. The transaction data may include service level agreement information (described later).

As described above, the information processing apparatus 1 according to the first example embodiment employs the configuration of including: the acquisition section 11 that acquires log information of one or more communication infrastructures which constitute an end-to-end communication path; and the generation section 12 that generates transaction data which includes the log information and which is to be added to a block chain updated using a predetermined consensus algorithm. According to the configuration, it is possible to record, in a block chain, transaction data which includes log information.

Therefore, according to the information processing apparatus 1 of the first example embodiment, it is possible to bring about an effect of providing a technique that allows persons concerned with provision of a service to share information pertaining to a communication infrastructure which has been used to provide the service.

In the example embodiment illustrated in FIG. 1, the acquisition section 11 and the generation section 12 are described as being incorporated in the single information processing apparatus 1. Note, however, that the acquisition section 11 and the generation section 12 do not necessarily need to be incorporated in a single information processing apparatus. For example, the acquisition section 11 and the generation section 12 may be disposed separately. The acquisition section 11 and the generation section 12 may be connected to each other via wired communication or wireless communication. Alternatively, one of or both of the acquisition section 11 and the generation section 12 may be provided on a cloud. The same applies to apparatus configurations which will be described later.

(Flow of Information Processing Method S1)

Figure 2:
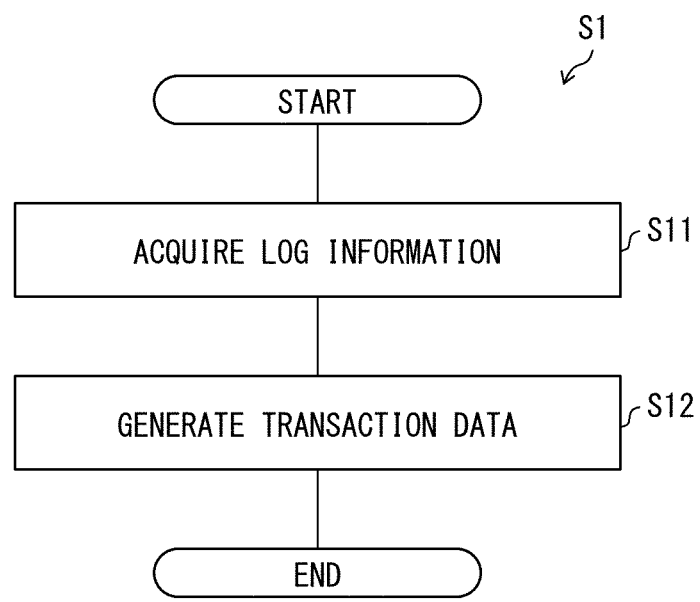
FIG. 2 is a flowchart illustrating a flow of an information processing method S1 which is carried out by the information processing apparatus 1 according to the first example embodiment of the present invention.

Next, the following description will discuss an information processing method according to the first example embodiment, with reference to the drawings. FIG. 2 is a flowchart illustrating a flow of an information processing method S1 which is carried out by the information processing apparatus 1 according to the first example embodiment. As illustrated in FIG. 2, in step S11, the acquisition section 11 acquires log information of one or more communication infrastructures that constitute an end-to-end communication path. Next, in step S12, the generation section 12 generates transaction data which includes the log information and which is to be added to a block chain updated using a predetermined consensus algorithm. With this method, it is possible to record, in a block chain, transaction data which includes log information.

According to the information processing method S1 above, it is possible to bring about an effect of providing a technique that allows persons concerned with provision of a service to share information pertaining to a communication infrastructure which has been used to provide the service.

(Configuration of Information Processing Apparatus 2)

Figure 3:
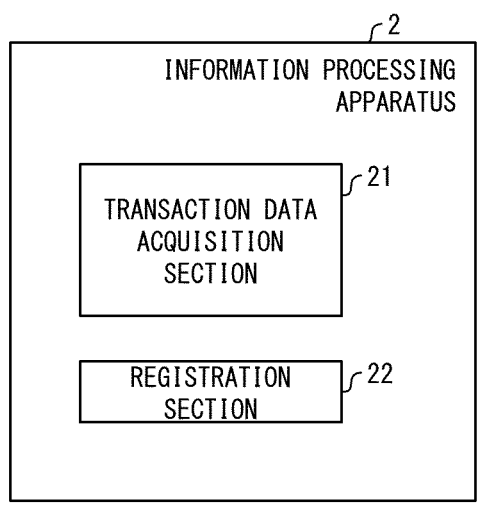
FIG. 3 is a block diagram illustrating a configuration of an information processing apparatus 2 according to the first example embodiment of the present invention.

Next, the following description will discuss an information processing apparatus 2 according to the first example embodiment, with reference to the drawings. FIG. 3 is a block diagram illustrating a configuration of the information processing apparatus 2 according to the first example embodiment. As illustrated in FIG. 3, the information processing apparatus 2 includes a transaction data acquisition section 21 and a registration section 22. The transaction data acquisition section 21 acquires transaction data that includes log information of one or more communication infrastructures which constitute an end-to-end communication path, and that is to be added to a block chain updated using a predetermined consensus algorithm. The registration section 22 registers the transaction data in the block chain. The transaction data acquisition section 21 is an embodiment of the "transaction data acquisition means" recited in claims. The registration section 22 is an embodiment of the "registration means" recited in claims.

The transaction data acquisition section 21 acquires transaction data generated by another apparatus. The registration section 22 registers, in the block chain, the transaction data acquired by the transaction data acquisition section 21.

As described above, the information processing apparatus 2 according to the first example embodiment employs the configuration of including: a transaction data acquisition means that acquires transaction data which includes log information of one or more communication infrastructures which constitute an end-to-end communication path, the transaction data being added to a block chain updated using a predetermined consensus algorithm; and a registration means that registers the transaction data in the block chain. According to the configuration, it is possible to register (store), in a block chain, transaction data which includes log information.

Therefore, according to the information processing apparatus 2 of the first example embodiment, it is possible to bring about an effect of providing a technique that allows persons concerned with provision of a service to share information pertaining to a communication infrastructure which has been used to provide the service.

(Flow of Information Processing Method S2)

Figure 4:
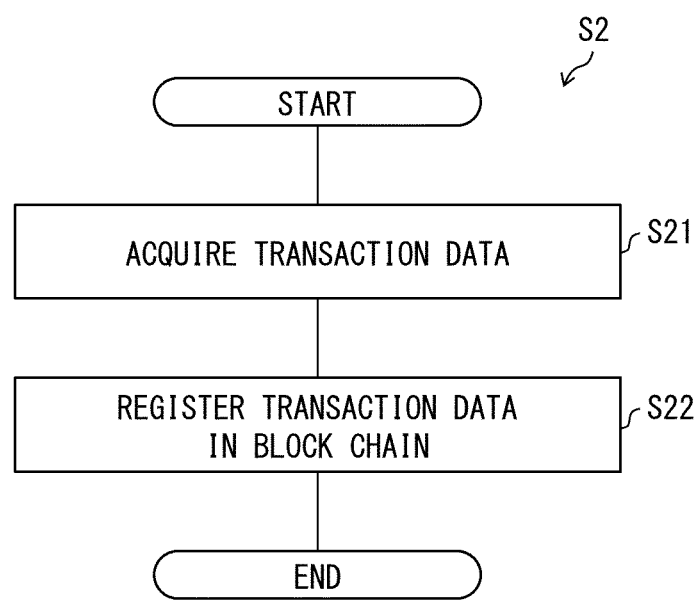
FIG. 4 is a flowchart illustrating a flow of an information processing method S2 which is carried out by the information processing apparatus 2 according to the first example embodiment of the present invention.

Next, the following description will discuss a flow of an information processing method S2 according to the first example embodiment, with reference to the drawings. FIG. 4 is a flowchart illustrating a flow of the information processing method S2 which is carried out by the information processing apparatus 2 according to the first example embodiment. As illustrated in FIG. 4, in step S21, the transaction data acquisition section 21 acquires transaction data that includes log information of one or more communication infrastructures which constitute an end-to-end communication path, and that is to be added to a block chain updated using a predetermined consensus algorithm. Next, in step S22, the registration section 22 registers the transaction data in the block chain. With this method, it is possible to record, in a block chain, transaction data which includes log information.

Therefore, according to the information processing method S2 of the first example embodiment, it is possible to bring about an effect of providing a technique that allows persons concerned with provision of a service to share information pertaining to a communication infrastructure which has been used to provide the service.

(Configuration of Information Processing Apparatus 3)

Figure 5:
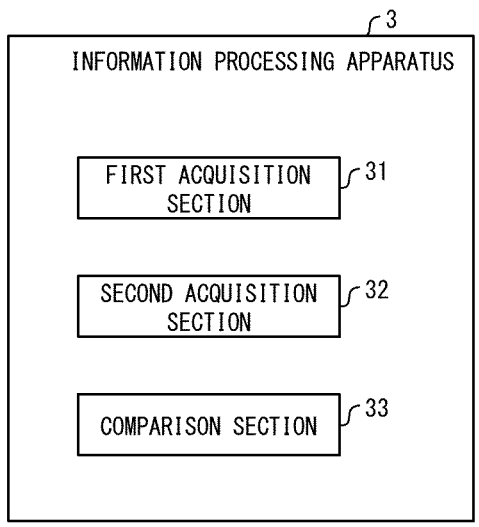
FIG. 5 is a block diagram illustrating a configuration of an information processing apparatus 3 according to the first example embodiment of the present invention.

Next, the following description will discuss an information processing apparatus 3 according to the first example embodiment, with reference to the drawings. FIG. 5 is a block diagram illustrating a configuration of the information processing apparatus 3 according to the first example embodiment. As illustrated in FIG. 5, the information processing apparatus 3 includes a first acquisition section 31, a second acquisition section 32, and a comparison section 33. The first acquisition section 31 acquires, from transaction data, log information of one or more communication infrastructures which have been used to provide a service identified by a certain service ID. Here, the transaction data is identified by the certain service ID, and is registered in a block chain updated using a predetermined consensus algorithm. The second acquisition section 32 acquires service level agreement information pertaining to the service identified by the certain service ID. The comparison section 33 compares the log information with the service level agreement information and outputs a comparison result. The first acquisition section 31 is an embodiment of the "first acquisition means" recited in claims. The second acquisition section 32 is an embodiment of the "second acquisition means" recited in claims. The comparison section 33 is an embodiment of the "comparison means" recited in claims.

In the present example embodiment, the service ID is a code associated with transaction data described above. Therefore, it is possible to acquire, from a service ID, content of transaction data associated with the service ID. In the present example embodiment, the service level agreement information is information pertaining to quality of a communication infrastructure used to provide a service, which has been agreed between a provider of the service and one or more telecommunications carriers. Specifically, the service level agreement information may include a communication path requirement (e.g., a communication capacity, a communication rate, and the like of a communication path) and a communication apparatus requirement (e.g., a connection time, a transfer rate, and the like of a communication apparatus). The service level agreement information may include a communication requirement agreed between a provider of a service and a user of the service, an operation requirement of a communication infrastructure defined by some sort of standard, or the like. In the present example embodiment, the transaction data includes service level agreement information. Hereinafter, the service level agreement information is referred to also as service level agreement (SLA).

The comparison result output by the comparison section 33 is, for example, a result indicating whether or not quality (such as a communication rate and a communication data volume) recorded in log information of a communication infrastructure provided by a certain telecommunications carrier has satisfied quality of the agreed SLA.

As described above, the information processing apparatus 3 according to the first example embodiment employs a configuration of including: a first acquisition means that acquires, from transaction data identified by a certain service ID, log information of one or more communication infrastructures which have been used to provide a service identified by the certain service ID, the transaction data being registered in a block chain updated using a predetermined consensus algorithm; a second acquisition means that acquires service level agreement information pertaining to the service identified by the certain service ID; and a comparison means that compares the log information with the service level agreement information and outputs a comparison result. According to the configuration, the registered transaction data is compared with the service level agreement information, and the comparison result is output.

Therefore, according to the information processing apparatus 3 of the first example embodiment, it is possible to bring about an effect of allowing persons concerned with provision of a service to verify whether or not a communication service used to provide the service has satisfied service level agreement information, as well as the effect of providing a technique that allows persons concerned with provision of the service to share information pertaining to a communication infrastructure which has been used to provide the service.

(Flow of Information Processing Method S3)

Figure 6:
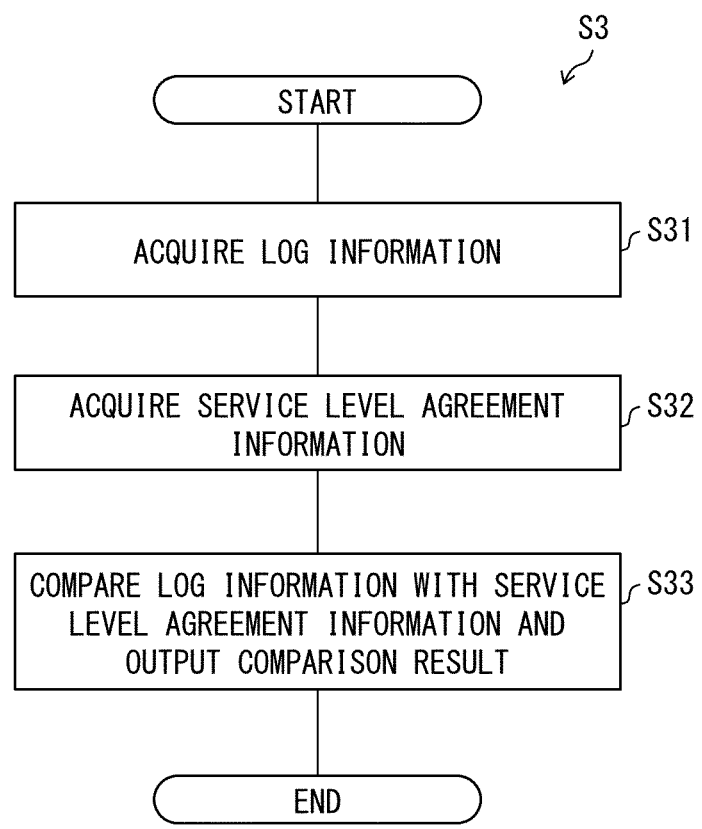
FIG. 6 is a flowchart illustrating a flow of an information processing method S3 which is carried out by the information processing apparatus 3 according to the first example embodiment of the present invention.

Next, the following description will discuss a flow of an information processing method S3 according to the first example embodiment, with reference to the drawings. FIG. 6 is a flowchart illustrating a flow of the information processing method S3 which is carried out by the information processing apparatus 3 according to the first example embodiment. As illustrated in FIG. 6, in step S31, the first acquisition section 31 acquires, from transaction data, log information of one or more communication infrastructures which have been used to provide a service identified by a certain service ID. Here, the transaction data is identified by the certain service ID, and is registered in a block chain updated using a predetermined consensus algorithm. Next, in step S32, the second acquisition section 32 acquires service level agreement information pertaining to the service identified by the certain service ID. Next, in step S33, the comparison section 33 compares the log information with the service level agreement information and outputs a comparison result.

Therefore, according to the information processing method S3 of the first example embodiment, it is possible to bring about an effect of allowing persons concerned with provision of a service to verify whether or not a communication service used to provide the service has satisfied service level agreement information, as well as the effect of providing a technique that allows persons concerned with provision of the service to share information pertaining to a communication infrastructure which has been used to provide the service.

(Configuration of Information Processing System 6)

Figure 7:
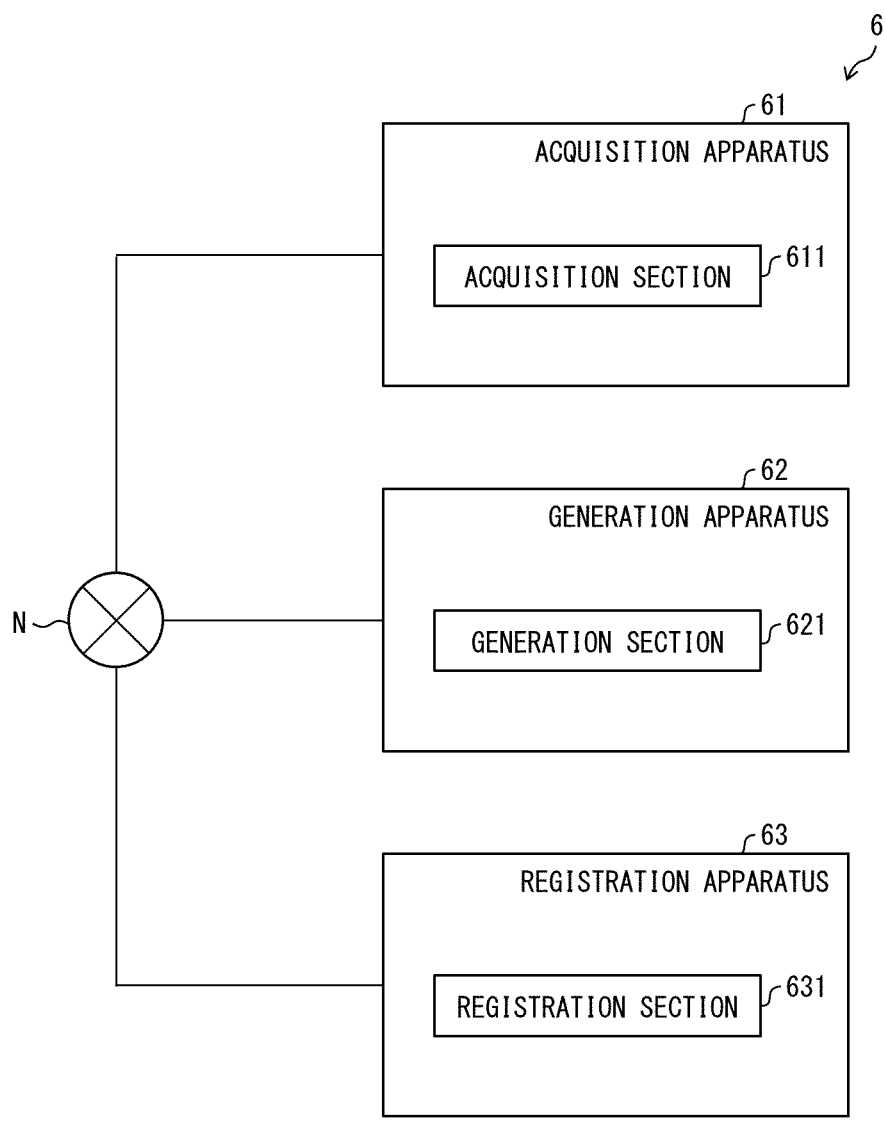
FIG. 7 is a block diagram illustrating a configuration of an information processing system 6 according to the first example embodiment of the present invention.

Next, the following description will discuss an information processing system 6 according to the first example embodiment, with reference to the drawings. FIG. 7 is a block diagram illustrating a configuration of the information processing system 6 according to the first example embodiment. As illustrated in FIG. 7, the information processing system 6 includes an acquisition apparatus 61, a generation apparatus 62, and a registration apparatus 63. The acquisition apparatus 61 includes an acquisition section 611. The generation apparatus 62 includes a generation section 621. The registration apparatus 63 includes a registration section 631. The acquisition section 611, the generation section 621, and the registration section 631 have functions similar to those of the acquisition section 11, the generation section 12, and the registration section 22, respectively, which are described above. In the example illustrated in FIG. 7, the acquisition apparatus 61, the generation apparatus 62, and the registration apparatus 63 are communicably connected to each other via, for example, a wireless communication network N. The wireless communication may be, for example, long term evolution (LTE), local 5G, 5G, Wi-fi (registered trademark), or the like.

The acquisition section 611 acquires log information of one or more communication infrastructures that constitute an end-to-end communication path. The generation section 621 generates transaction data which includes the log information and which is to be added to a block chain updated using a predetermined consensus algorithm. The registration section 631 registers the transaction data in the block chain.

The acquisition section 611, the generation section 621, and the registration section 631 are respectively incorporated in the acquisition apparatus 61, the generation apparatus 62, and the registration apparatus 63 which are independent of each other. The acquisition section 611, the generation section 621, and the registration section 631 are connected to each other in a wired or wireless manner so that information communication can be carried out. Alternatively, some of or all of the acquisition section 611, the generation section 621, and the registration section 631 may be disposed on a cloud so that information communication can be carried out.

As described above, the information processing system 6 according to the first example embodiment employs the configuration of including: the acquisition section 611 that acquires log information of one or more communication infrastructures which constitute an end-to-end communication path; the generation section 621 that generates transaction data which includes the log information and which is to be added to a block chain updated using a predetermined consensus algorithm; and the registration section 631 that registers the transaction data in the block chain. According to the configuration, transaction data which includes log information is recorded in a block chain.

Therefore, according to the information processing system 6 of the first example embodiment, it is possible to bring about an effect of providing a technique that allows persons concerned with provision of a service to share information pertaining to a communication infrastructure which has been used to provide the service.

Second Example Embodiment

Figure 8:
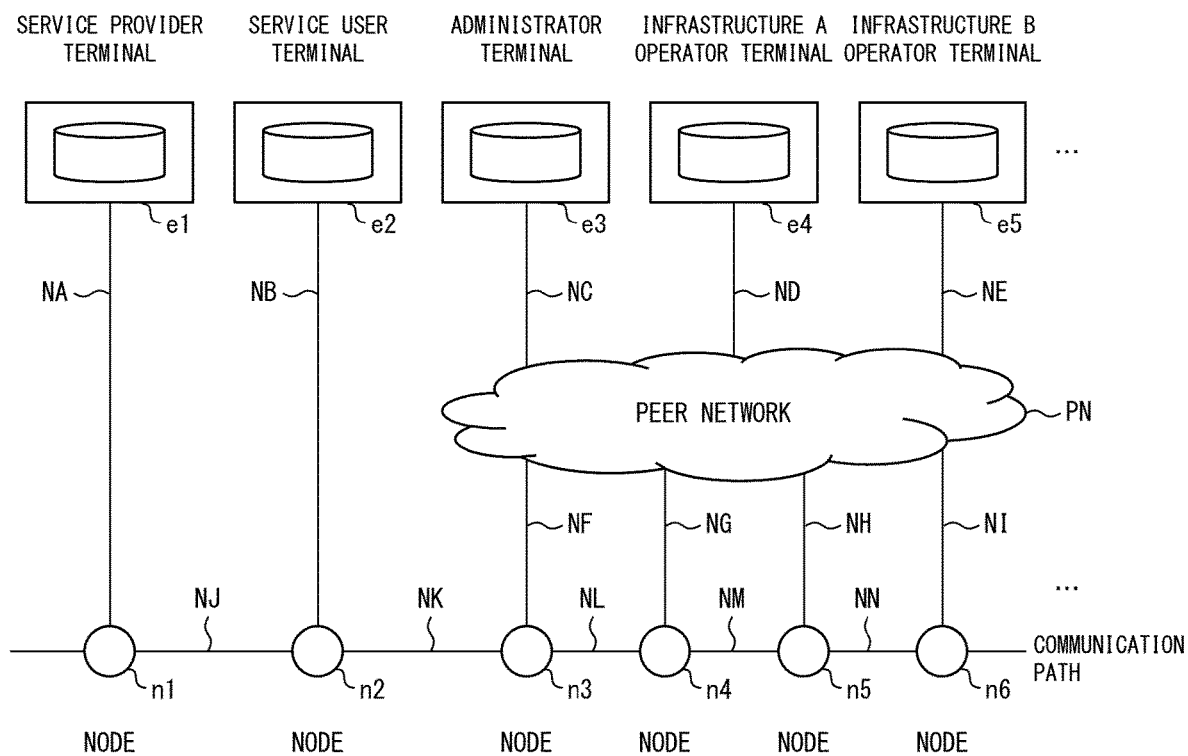
FIG. 8 is a diagram illustrating an example of a communication network according to a second example embodiment of the present invention.

Next, the following description will discuss a second example embodiment of the present invention with reference to the drawings. Descriptions as to constituent elements which have functions identical with those described in the first example embodiment are omitted as appropriate. In the present example embodiment, transaction data is generated by a service provider terminal, and a block is generated by an administrator terminal and is registered in a block chain. FIG. 8 is a diagram illustrating an example of a communication network according to the second example embodiment.

(Configuration of Communication Network)

As illustrated in FIG. 8, the present example embodiment illustrates, as terminals used by end users, a service provider terminal e1, a service user terminal e2, an administrator terminal e3, a terminal e4 of an operator of a communication infrastructure A (hereinafter, referred to also as "telecommunications carrier A"), and a terminal e5 of an operator of a communication infrastructure B (hereinafter, referred to also as "telecommunications carrier B"). The service provider and the service user are end users who have concluded a service contract. For example, the service provider uses the communication infrastructure A owned by the telecommunications carrier A and the communication infrastructure B owned by the telecommunications carrier B to provide a service. The administrator starts a block chain in which information according to the present example embodiment is recorded. The administrator is a member who participates in the block chain.

The terminals are connected to each other via a plurality of nodes n1 through n6. A communication path NA is a path for connecting the service provider terminal e1 to the node n1. A communication path NB is a path for connecting the service user terminal e2 to the node n2. The terminals may be connected to each other via a peer network PN. The peer network PN is a network that is configured so that terminals can exchange information in an end-to-end manner on the network. FIG. 8 illustrates a state in which the administrator terminal e3, the terminal e4 of the telecommunications carrier A, and the terminal e5 of the telecommunications carrier B are connected to each other via a peer network PN. The administrator terminal e3, the terminal e4 of the telecommunications carrier A, and the terminal e5 of the telecommunications carrier B are connected to the peer network PN via a communication path NC, a communication path ND, and a communication path NE, respectively. The nodes n3 through n6 are connected to the peer network PN via communication paths NF, NG, NH, and NI, respectively. The node n1 is connected to the node n2, the node n3 is connected to the node n4, the node n4 is connected to the node n5, and the node n5 is connected to the node n6 via communication paths NJ, NK, NL, NM, and NN, respectively. The following description will discuss a configuration and a procedure in which an end user generates transaction data and registers the data in a block chain in such a network environment.

(Configuration of Service Provider Terminal 100)

Figure 9:
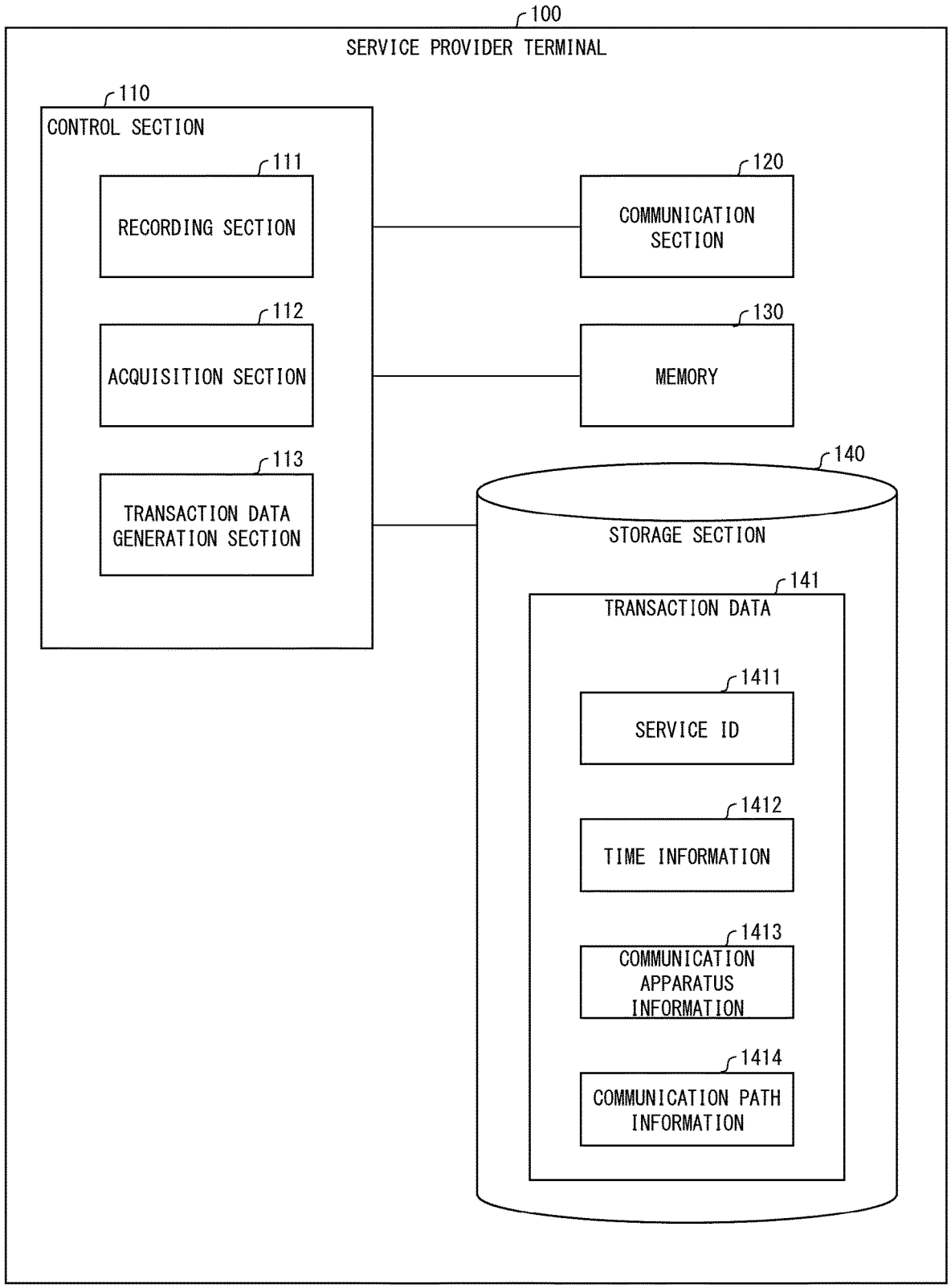
FIG. 9 is a block diagram illustrating a configuration example of a terminal of a service provider according to the second example embodiment of the present invention.

FIG. 9 is a block diagram illustrating a configuration example of a service provider terminal 100 (which is an example of the terminal e1) according to the present example embodiment. As illustrated in FIG. 9, the terminal 100 includes a control section 110, a communication section 120, a memory 130, and a storage section 140. The control section 110 comprehensively controls the entire terminal 100. The communication section 120 communicates with an external apparatus. The memory 130 stores a program and various kinds of data which are used by the control section 110. The storage section 140 stores various kinds of information and generated transaction data (described later).

The following description will discuss details of the control section 110. The control section 110 includes a recording section 111, an acquisition section 112, and a transaction data generation section 113. The recording section 111 records, in the storage section 140, a service ID for identifying a service, a service time, communication-related information, and the like. The acquisition section 112 acquires the service ID, the time information, the communication-related information, and the like via the communication section 120. The time information is time information indicating a service start time, a service end time, and the like. The communication-related information and the like are communication apparatus information and communication path information, as described above. The time information, the communication-related information, and the like are log information of one or more communication infrastructures which have been used to provide a service.

The transaction data generation section 113 generates transaction data from information recorded in the storage section 140. The transaction data generation section 113 associates transaction data 141 with a service ID for identifying a service. Specifically, in the present example embodiment, as illustrated in FIG. 9, the transaction data 141 includes a service ID 1411, time information 1412, communication apparatus information 1413, and communication path information 1414. The communication apparatus information is, for example, information indicating a state (status) of a communication apparatus. The information indicating a state of a communication apparatus is, for example, information indicating a state in which the apparatus is operating normally or is not operating normally, a time taken for connection of the communication apparatus, a data transfer rate, or the like. The communication path information is, for example, information that indicates a state (status) of a communication path. The information indicating a state of a communication path is, for example, information indicating a connection state of the communication path, a communication capacity, a communication rate, or the like. Note that the time needs to be a time synchronized on the network. Therefore, for example, a network time protocol (NTP) is used.

The transaction data generation section 113 includes, in the transaction data 141, at least one of (i) a communication path ID for identifying a communication path which has been used to provide the service and (ii) a communication apparatus ID for identifying a communication apparatus which has been used to provide the service, as the log information. The transaction data 141 can include all of communication apparatus information, communication path information, a communication apparatus ID, and a communication path ID. The communication path ID is a code associated with communication path information, and it is possible to acquire communication path information from the communication path ID. The communication apparatus ID is a code associated with communication apparatus information, and it is possible to acquire the communication apparatus information from the communication apparatus ID.

(Configuration of Administrator Terminal 200)

Figure 10:
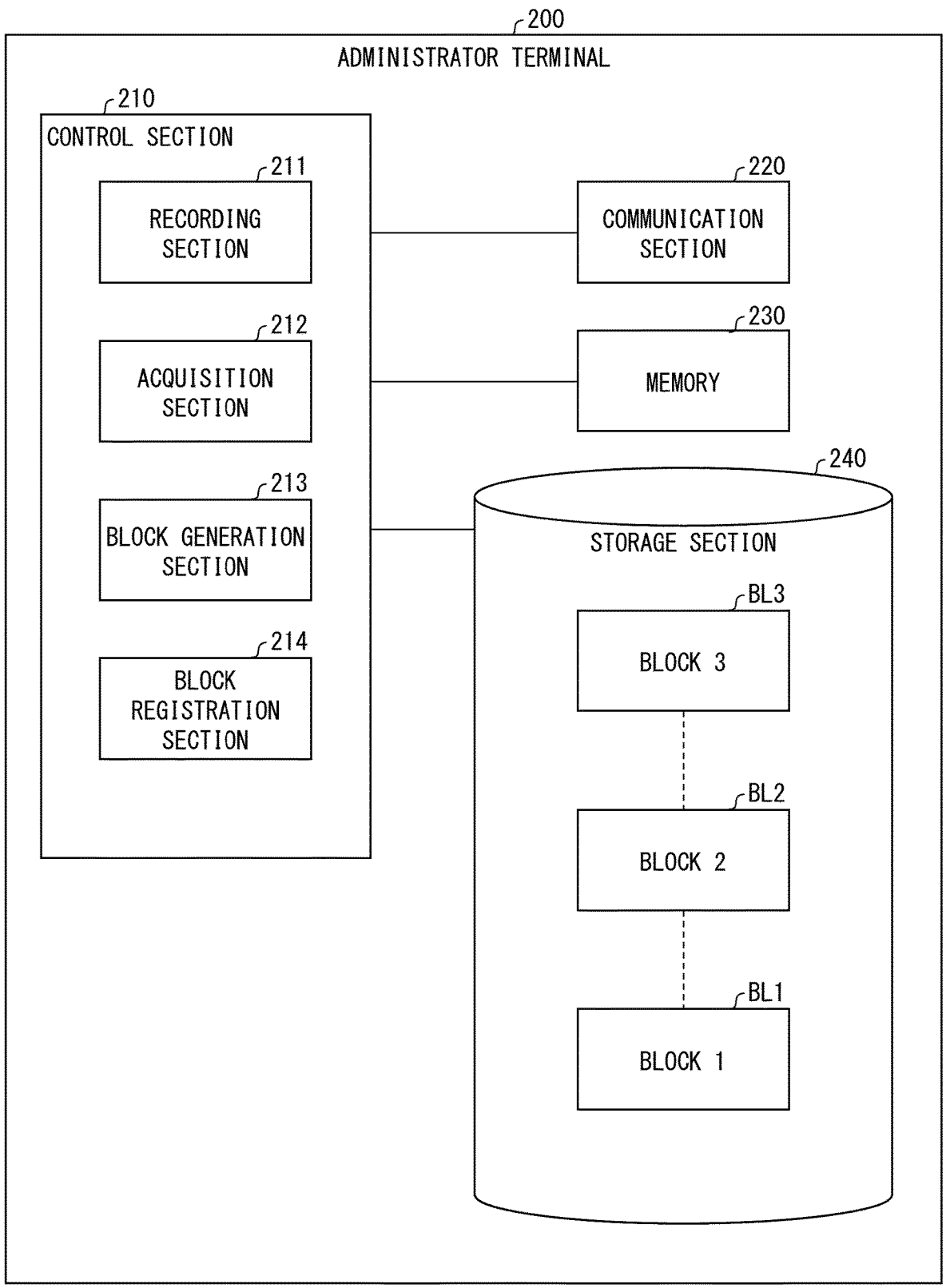
FIG. 10 is a block diagram illustrating a configuration example of a terminal of an administrator according to the second example embodiment of the present invention.

FIG. 10 is a block diagram illustrating a configuration example of an administrator terminal 200 (which is an example of the terminal e3) according to the present example embodiment. As illustrated in FIG. 10, the terminal 200 includes a control section 210, a communication section 220, a memory 230, and a storage section 240. The control section 210 comprehensively controls the entire terminal 200. The communication section 220 communicates with an external apparatus. The memory 230 stores a program and various kinds of data which are used by the control section 210. The storage section 240 stores a block 1 (BL1), a block 2 (BL2), a block 3 (BL3), and so forth which are pieces of block data constituting a block chain.

The following description will discuss details of the control section 210. The control section 210 includes a recording section 211, an acquisition section 212, a block generation section 213, and a block registration section 214. The recording section 211 records, in the storage section 240, transaction data which has been acquired by the acquisition section 212 via the communication section 220. The block generation section 213 generates a block for registration in the block chain from information recorded in the storage section 240. The data recorded in the block will be described later. The block registration section 214 registers, in the block chain, a block for which approval has been obtained from other end users based on a predetermined consensus algorithm. The block registration section 214 is an embodiment of the "registration means" recited in claims. In the present example embodiment, proof of work (PoW) is used as the predetermined consensus algorithm. Note, however, that the consensus algorithm is not limited to PoW, and it is possible to use proof of stake (POS), proof of importance (PoI), proof of human-work (PoH), or the like.

The administrator terminal 200 has been described as an example. Note that each of end users participating in the block chain owns a terminal having a similar configuration, and the block chain is recorded in the terminal. That is, the terminal e4 of the telecommunications carrier A and the terminal e5 of the telecommunications carrier B each also have a similar configuration.

Figure 11:
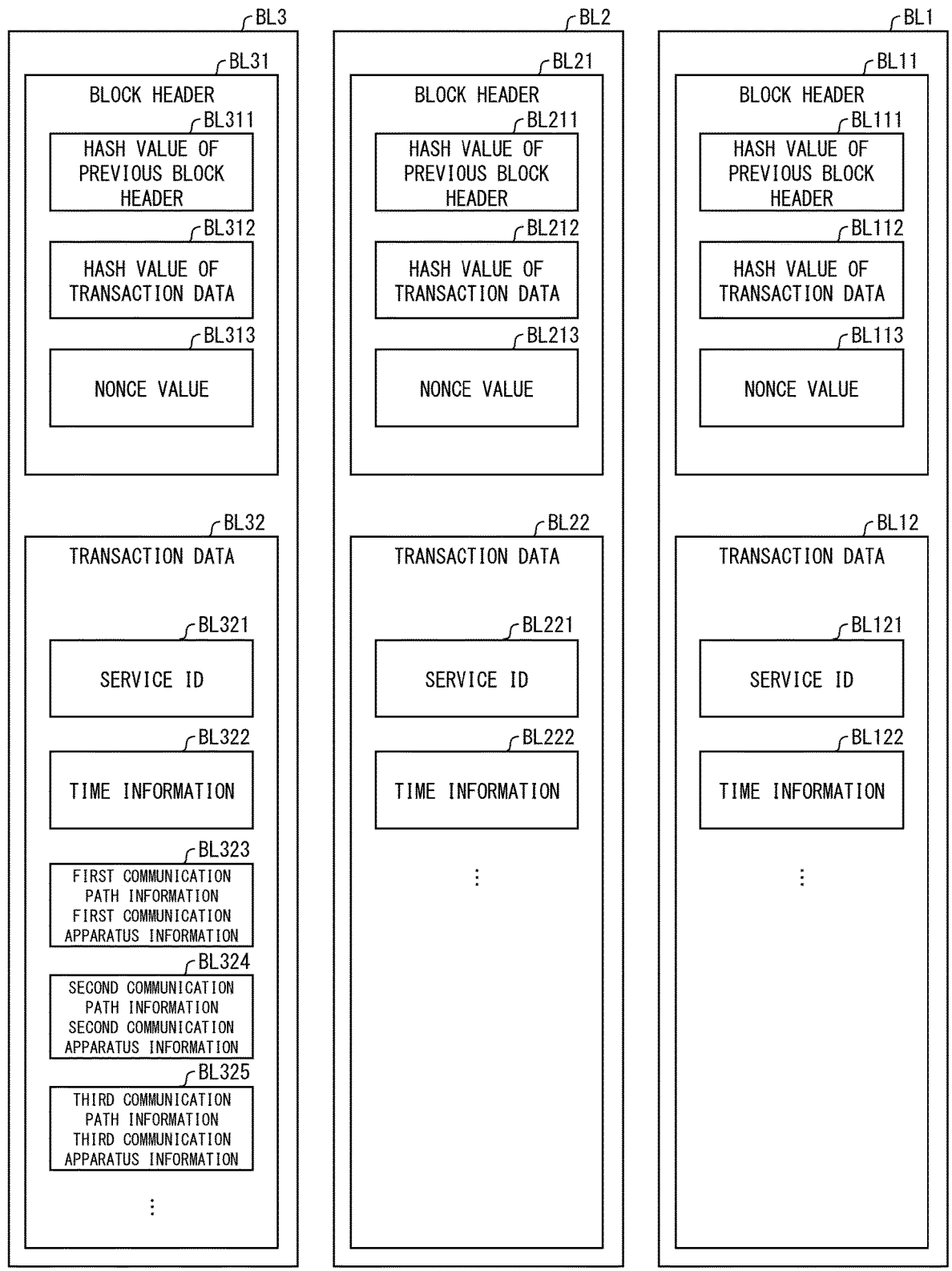
FIG. 11 is a diagram illustrating an example of data that is included in a block generated by a block generation section.

Next, the following description will discuss data that is included in a block generated by the block generation section 213. FIG. 11 is a diagram illustrating an example of data that is included in a block generated by the block generation section 213. The block is registered in a block chain in order of approval of data. The block is registered in a chain block in order of approval of data. In FIG. 11, a block BL3 is the newest data. Data included in the block BL3 includes a block header BL31 and transaction data BL32.

The block header BL31 includes a hash value BL311 of a block header BL21 of a previous block (block BL2 in FIG. 11), a hash value BL312 of transaction data, and a nonce value BL313. The hash value is a bit string that is obtained using a hash function. The hash function is a function that generates a fixed-length bit string from an arbitrary-length bit string. The nonce value is a bit string having a random fixed length that satisfies a predetermined condition.

The transaction data BL32 includes a service ID BL321, time information BL322, first communication-related information BL323, second communication-related information BL324, third communication-related information BL325, and so forth. The first communication-related information BL323 includes first communication path information and first communication apparatus information which are owned by a first telecommunications carrier (e.g., telecommunications carrier A). Similarly, the second communication-related information BL324 includes second communication path information and second communication apparatus information which are owned by a second telecommunications carrier (e.g., telecommunications carrier B), and the third communication-related information BL325 includes third communication path information and third communication apparatus information which are owned by a third telecommunications carrier. As such, pieces of communication-related information are included whose number corresponds to the number of involved telecommunications carriers.

The data included in the block BL3 has been described above. The same applies to data included in the other block BL2 and data included in the other block BL1. Therefore, descriptions thereof will not be repeated.

(Flow in which Data is Registered)

Figure 12:
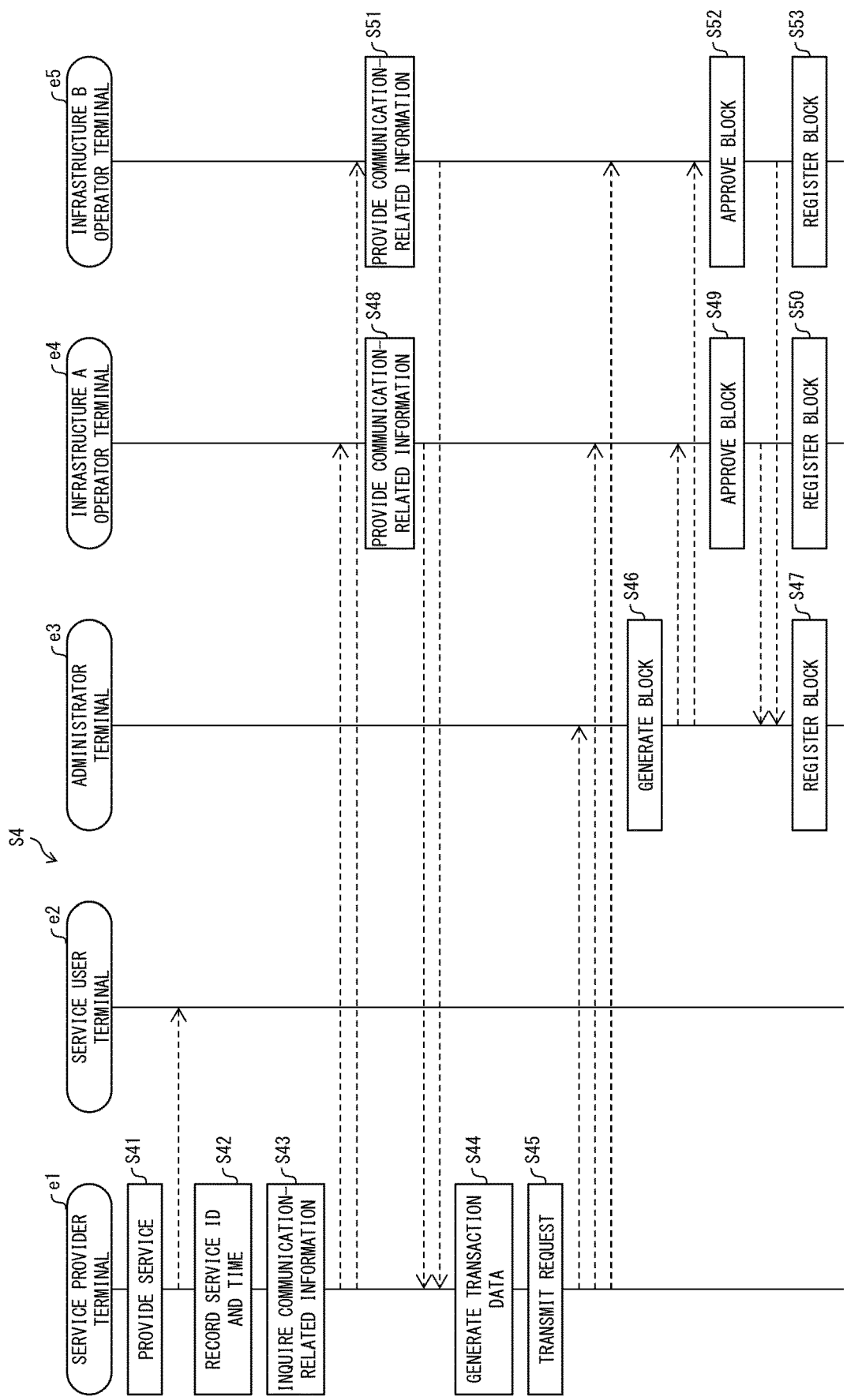
FIG. 12 is a timing diagram illustrating a flow in which a block generated by an end user is registered in a block chain.

Next, the following description will discuss a flow in which transaction data is generated by a service provider terminal, and the transaction data is registered in a block chain that is stored in each end user terminal. FIG. 12 is a timing diagram S4 illustrating a flow in which a block generated by a service provider terminal is registered in a block chain that is recorded in each end user terminal. An "infrastructure A operator" indicated in FIG. 12 is an operator which owns a communication infrastructure A, and is hereinafter referred to as a "telecommunications carrier A". Moreover, an "infrastructure B operator" is an operator which owns a communication infrastructure B, and is hereinafter referred to as a "telecommunications carrier B".

The left end in FIG. 12 is an operation that is carried out in a service provider terminal e1. First, in step S41, the service provider terminal e1 provides a service. Before step S41, negotiations are conducted and a contract is made between the service provider and a service user in regard to a service transaction. Note, however, that such negotiations and contract are not illustrated in FIG. 12.

Next, in step S42, the service provider terminal e1 records a service ID and a service time. The service time includes a service start time and a service end time. Next, in step S43, the service provider terminal e1 transmits an inquiry to a terminal e4 of the telecommunications carrier A and a terminal e5 of the telecommunications carrier B, which are involved in provision of the service, for requesting provision of communication-related information.

In response to this, the terminal e4 of the telecommunications carrier A provides (transmits), in step S48, communication-related information A (which is communication-related information owned by the telecommunications carrier A) to the service provider terminal e1. Moreover, in step S51, the terminal e5 of the telecommunications carrier B provides (transmits) communication-related information B to the service provider terminal e1. In response to this, in step S44, the service provider terminal e1 generates transaction data that includes the pieces of communication-related information A and B. Then, in step S45, the service provider terminal e1 transmits a request for preparation of a block to the end user terminals e3, e4, and e5 together with the transaction data.

In response to this, the end user terminals e3, e4, and e5 search for a nonce value that satisfies a predetermined condition. In the present example embodiment, it is assumed that the administrator terminal e3 first finds a nonce value that satisfies the predetermined condition. Then, the administrator terminal e3 generates, in step S46, a block that includes the transaction data transmitted by the service provider terminal e1. Furthermore, the administrator terminal e3 transmits the generated block to the end user terminals e4 and e5 and requests approval. The end user terminals e4 and e5 confirm in respective step S49 and step S52 that the nonce value is correct, and return approval to the administrator terminal e3.

In response to this, the administrator terminal e3 registers the block in the block chain in step S47. Similarly, the terminals e4 and e5 of the telecommunications carriers A and B register, in respective step S50 and step S53, the block generated by the administrator terminal e3 in the block chains that are stored in the respective storage sections thereof.

The above description has discussed an example in which each end user terminal searches for a nonce value that satisfies the predetermined condition. Note, however, that a terminal of an administrator of a certain organization may search for a nonce value on behalf of end users.

With the above flow, the block generated by the administrator terminal e3 is registered in the block chains of the end user terminals e4 and e5. As described above, according to the configuration described in the second example embodiment, it is possible for end users to share transaction data that is registered in the block chain.

Therefore, according to the configuration in accordance with the second example embodiment, it is possible to bring about an effect of providing a technique that allows persons concerned with provision of a service to share information pertaining to a communication infrastructure which has been used to provide the service.

Third Example Embodiment

Next, the following description will discuss a third example embodiment of the present invention with reference to the drawings. Descriptions as to constituent elements which have functions identical with those described in the first and second example embodiments are omitted as appropriate. In the second example embodiment, it has been described that the service provider terminal generates transaction data. In the third example embodiment, an administrator terminal generates transaction data.

(Configuration of Service Provider Terminal 300)

Figure 13:
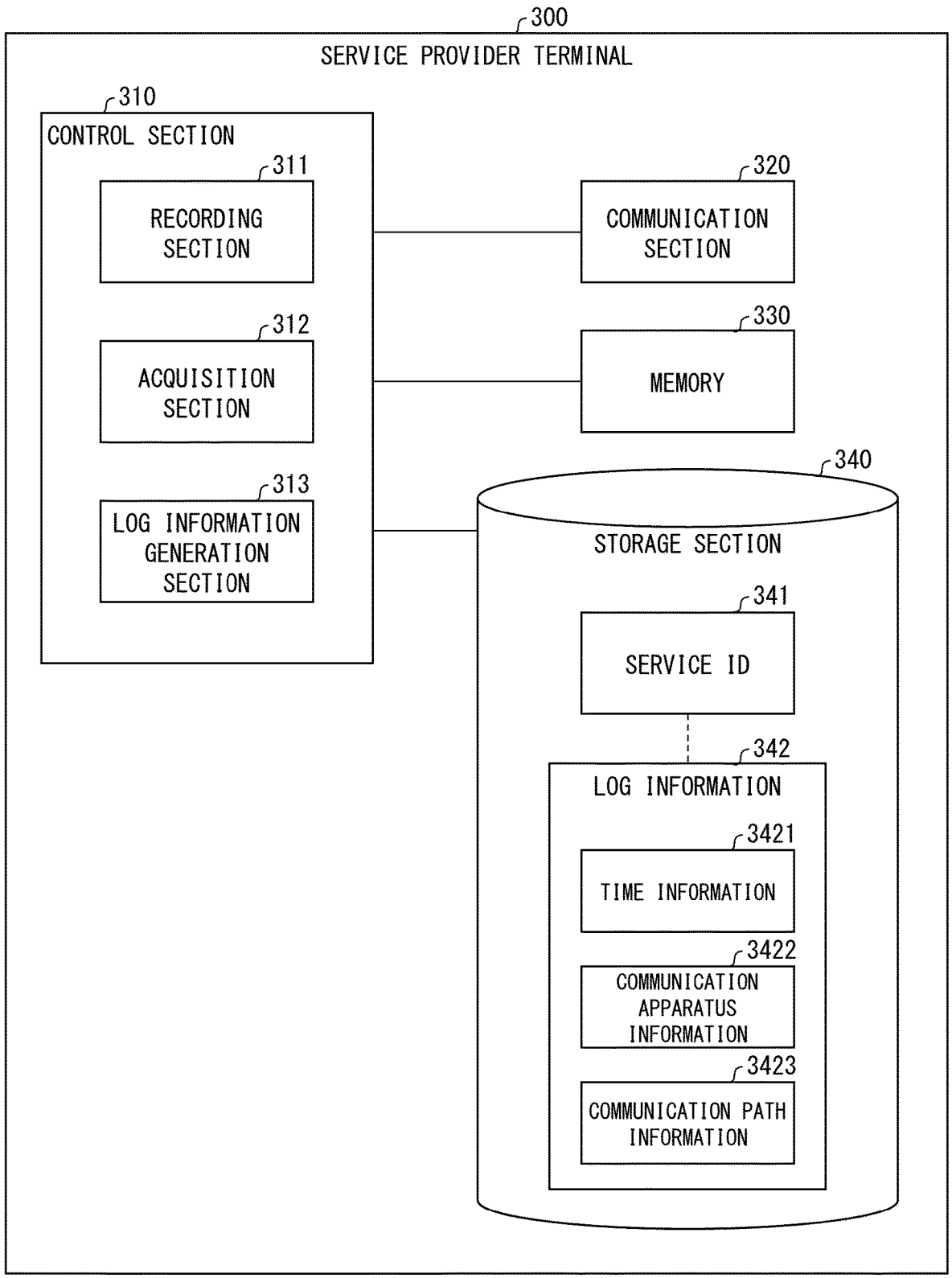
FIG. 13 is a block diagram illustrating a configuration example of a terminal of a service provider according to a third example embodiment of the present invention.

FIG. 13 is a block diagram illustrating a configuration example of a service provider terminal 300 (which is an example of the terminal e1) according to the present example embodiment. As illustrated in FIG. 13, the terminal 300 includes a control section 310, a communication section 320, a memory 330, and a storage section 340. The control section 310 comprehensively controls the entire terminal 300. The communication section 320 communicates with an external apparatus. The memory 330 stores a program and various kinds of data which are used by the control section 310. The storage section 340 stores various kinds of information and generated log information.

The following description will discuss details of the control section 310. The control section 310 includes a recording section 311, an acquisition section 312, and a log information generation section 313. The recording section 311 records, in the storage section 340, a service ID, time information, communication-related information, and the like. The acquisition section 312 acquires the service ID, the time information, the communication-related information, and the like via the communication section 320. The time information, the communication-related information, and the like are as described in the second example embodiment. The log information generation section 313 generates log information from information recorded in the storage section 340. As illustrated in FIG. 13, in the present example embodiment, log information 342 includes time information 3421, communication apparatus information 3422, and communication path information 3423. The log information 342 is associated with a service ID 341.

(Configuration of Administrator Terminal 400)

Figure 14:
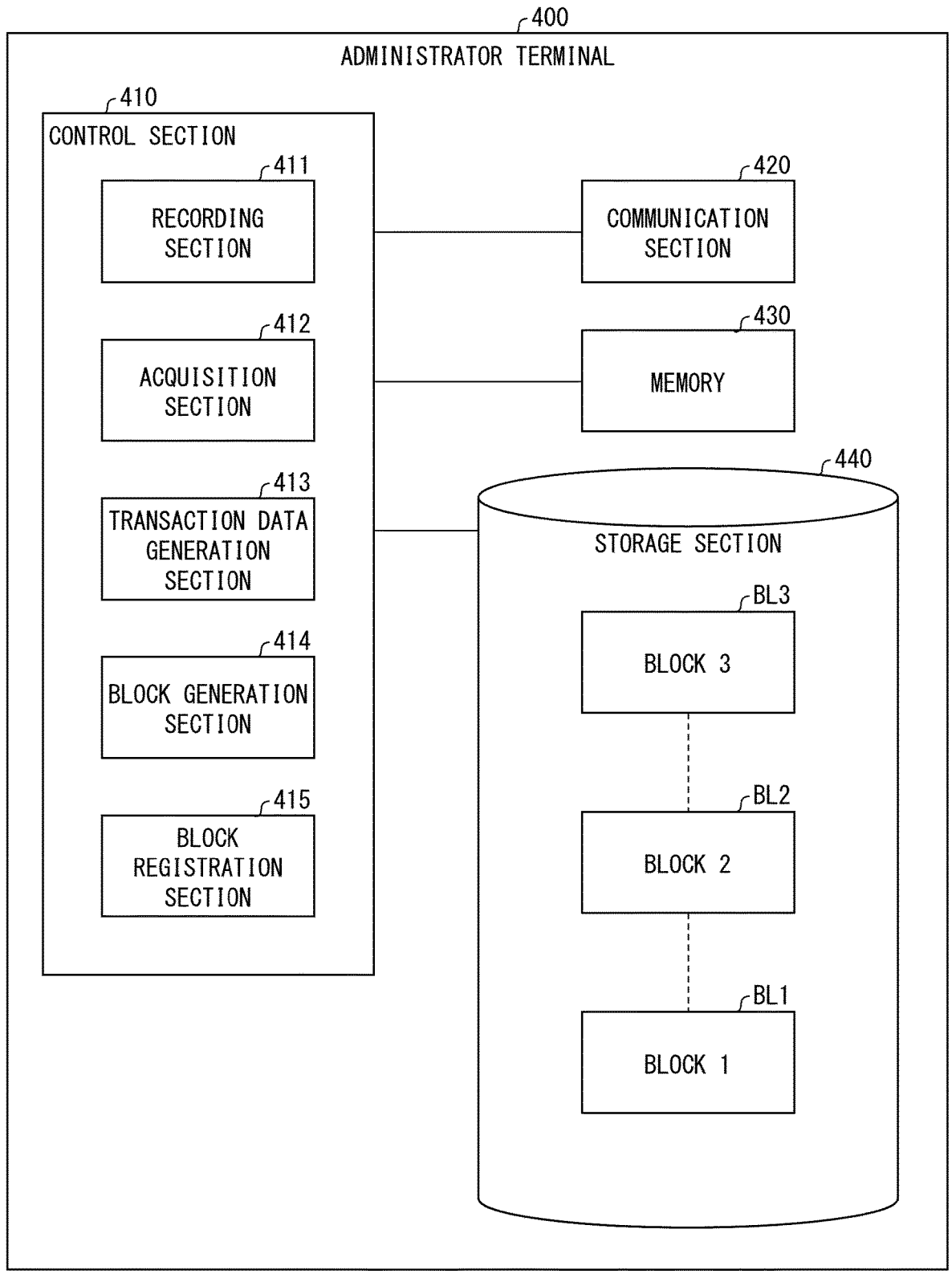
FIG. 14 is a block diagram illustrating a configuration example of a terminal of an administrator according to the third example embodiment of the present invention.

FIG. 14 is a block diagram illustrating a configuration example of an administrator terminal 400 (which is an example of the terminal e3) according to the present example embodiment. As illustrated in FIG. 14, the terminal 400 includes a control section 410, a communication section 420, a memory 430, and a storage section 440. The control section 410 comprehensively controls the entire terminal 400. The communication section 420 communicates with an external apparatus. The memory 430 stores a program and various kinds of data which are used by the control section 410. The storage section 440 stores a block 1 (BL1), a block 2 (BL2), a block 3 (BL3), and so forth which are pieces of block data constituting a block chain. Pieces of data recorded in the block 1 (BL1) and the like are the same as those described in the second example embodiment, and thus descriptions thereof will not be repeated.

The following description will discuss details of the control section 410. The control section 410 includes a recording section 411, an acquisition section 412, a transaction data generation section 413, a block generation section 414, and a block registration section 415. Among these, the recording section 411, the acquisition section 412, the block generation section 414, and the block registration section 415 are similar to the recording section 211, the acquisition section 212, the block generation section 213, and the block registration section 214, respectively, which have been described in the second example embodiment, and thus descriptions thereof will not be repeated.

The transaction data generation section 413 generates transaction data from information recorded in the storage section 440. Specifically, the transaction data is, for example, a service ID and log information associated with the service ID.

(Flow in which Data is Registered)

Figure 15:
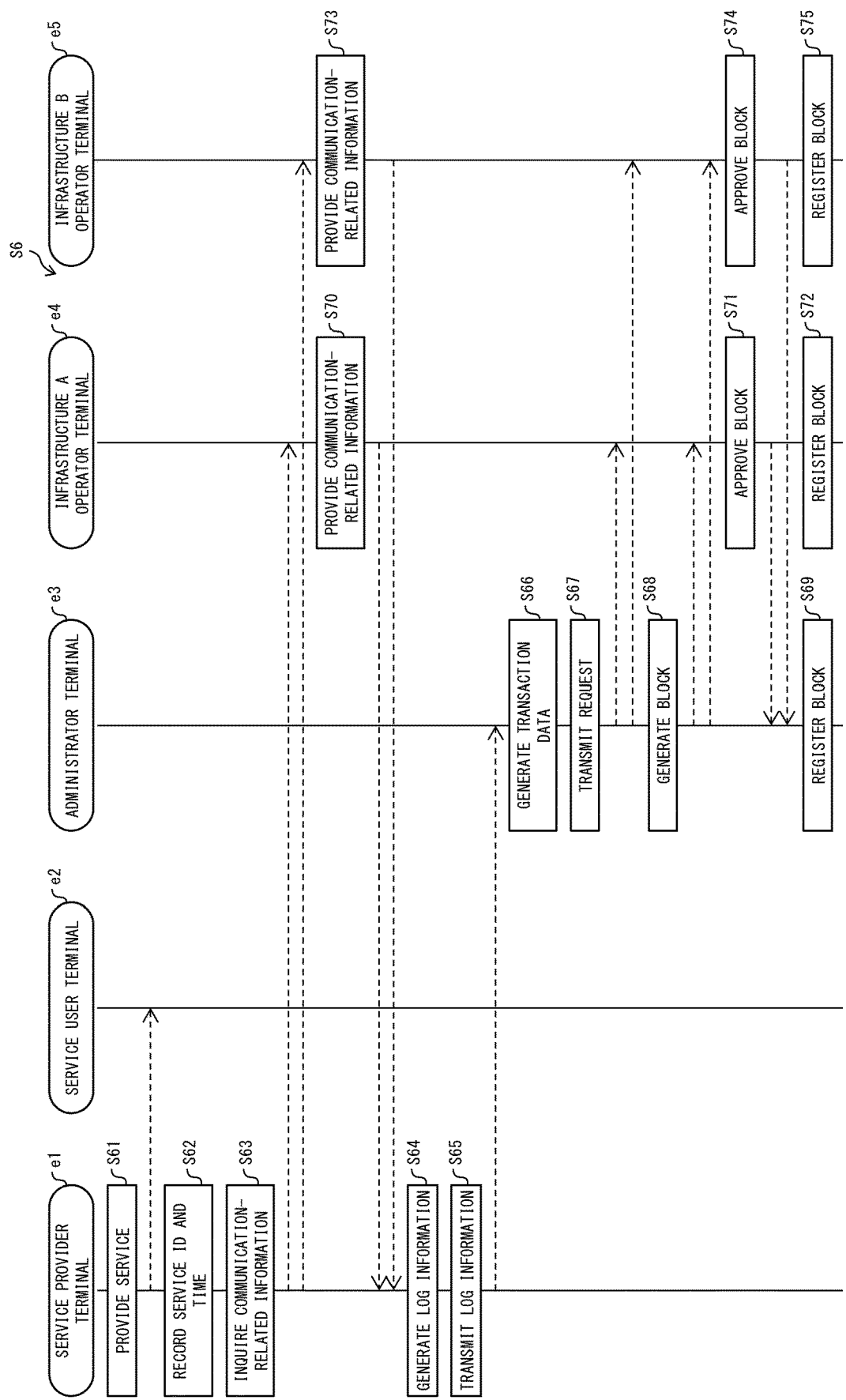
FIG. 15 is a timing diagram illustrating a flow in which a block generated by an administrator is registered in a block chain.

Next, the following description will discuss a flow in which transaction data is generated by an administrator terminal e3, and the transaction data is registered in block chains that are respectively stored in end user terminals e3, e4, and e5. FIG. 15 is a timing diagram S6 illustrating a flow in which a block generated by an administrator terminal e3 is registered in block chains of respective end user terminals e3, e4, and e5.

As illustrated in FIG. 15, first, in step S61, the service provider terminal e1 provides a service. Next, in step S62, the service provider terminal e1 records a service ID and a service time. The service time includes a service start time and a service end time. Next, in step S63, the service provider terminal e1 transmits an inquiry to the terminals e4 and e5 of the telecommunications carriers, which are involved in provision of the service, for requesting provision of communication-related information.

In response to this, the terminal e4 of the telecommunications carrier A provides (transmits), in step S70, communication-related information A to the service provider terminal e1. Moreover, in step S73, the terminal e5 of the telecommunications carrier B provides (transmits) communication-related information B to the service provider terminal e1. In response to this, in step S64, the service provider terminal e1 generates log information that includes the pieces of communication-related information A and B. Then, in step S65, the service provider terminal e1 transmits a request for preparation of transaction data to the administrator terminal e3 together with the log information.

In response to this, the administrator terminal e3 generates, in step S66, transaction data which includes the log information. Next, the administrator terminal e3 transmits, in step S67, a request for preparation of a block to the terminals e4 and e5 of the telecommunications carriers A and B together with the transaction data.

In response to this, the terminals e4 and e5 of the telecommunications carriers A and B search for a nonce value that satisfies a predetermined condition. In the present example embodiment, it is assumed that the administrator terminal e3 first finds a nonce value that satisfies the predetermined condition. Then, the administrator terminal e3 generates, in step S68, a block that includes the transaction data generated by itself. Furthermore, the administrator terminal e3 transmits the generated block to the terminals e4 and e5 of the telecommunications carriers A and B and requests approval. The terminals e4 and e5 of the telecommunications carriers A and B confirm in respective step S71 and step S74 that the nonce value is correct, and return approval to the administrator terminal e3.

In response to this, the administrator terminal e3 registers the block in the block chain in step S69. Similarly, the terminals e4 and e5 of the telecommunications carriers A and B register, in respective step S72 and step S75, the block generated by the administrator terminal e3 in the block chains that are stored in the respective storage sections thereof.

With the above flow, the block including the transaction data generated by the administrator terminal e3 is registered in the block chains respectively recorded in the end user terminals e3, e4, and e5. As described above, according to the configuration described in the third example embodiment, it is possible for end user terminals e3, e4, and e5 to share transaction data that is registered in the block chain.

Therefore, according to the configuration of the third example embodiment, it is possible to bring about an effect of providing a technique that allows persons concerned with provision of a service to share information pertaining to a communication infrastructure which has been used to provide the service.

Fourth Example Embodiment

Next, the following description will discuss a fourth example embodiment of the present invention with reference to the drawings. Descriptions as to constituent elements which have functions identical with those described in the first through third example embodiments are omitted as appropriate. In the fourth example embodiment, recorded log information is compared with service level agreement information, and the comparison result is output.

Figure 16:
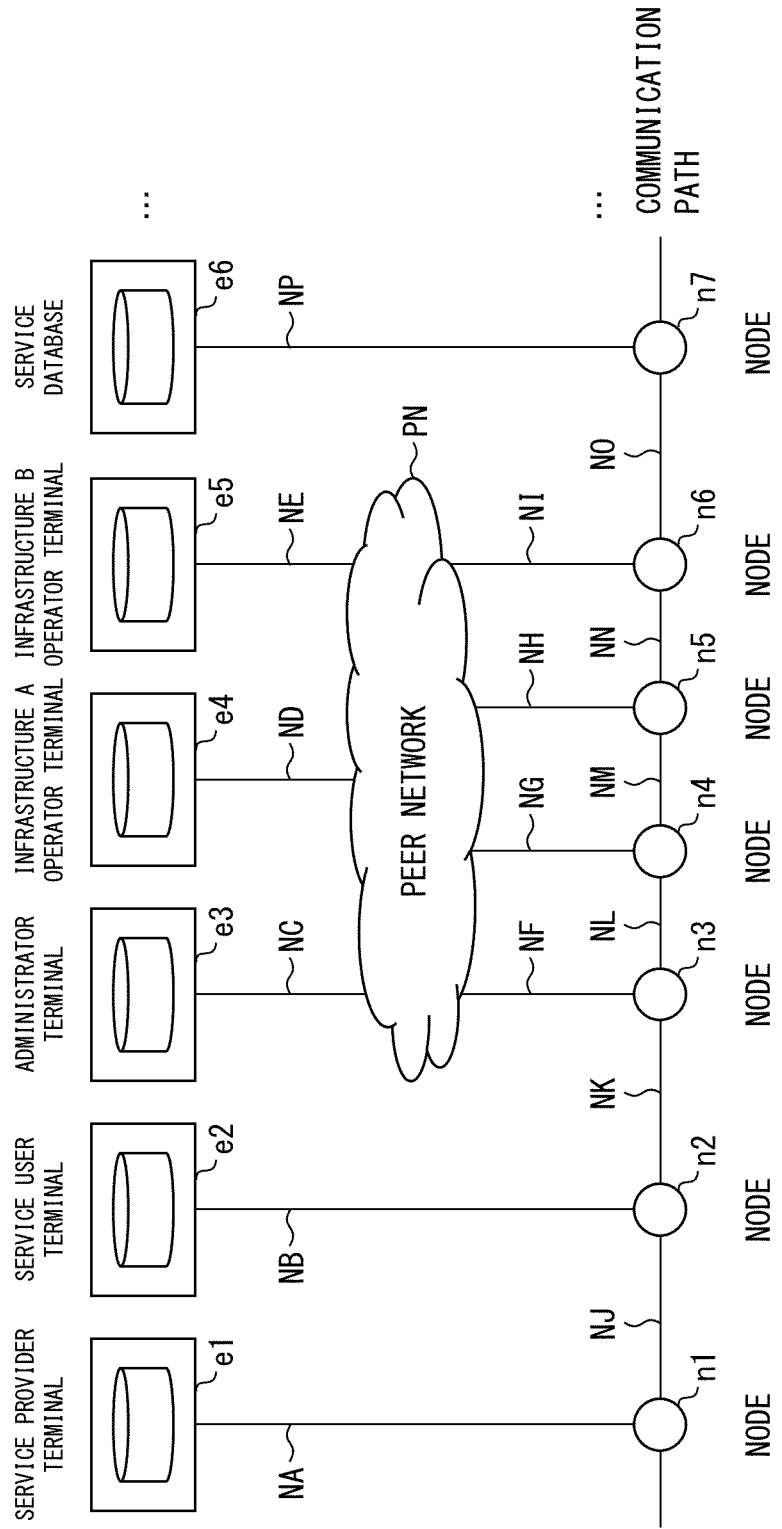
FIG. 16 is a diagram illustrating an example of a communication network according to a fourth example embodiment of the present invention.

FIG. 16 is a diagram illustrating an example of a communication network according to the present example embodiment. The communication network illustrated in FIG. 16 differs from the communication network illustrated in FIG. 8 in that the communication network illustrated in FIG. 16 includes a service database e6 that is communicably connected to the terminals, and a node n7 that is connected to the service database e6. In the service database e6, for example, transaction data stored in a block chain is stored together with a service ID associated therewith. The service database e6 may store, for example, service level agreement information. In this case, the service level agreement information is managed (stored) in association with a service ID. Therefore, the service level agreement information differs from service to service. The service database e6 may store communication-related information together with a specific code associated with the communication-related information.

Figure 17:
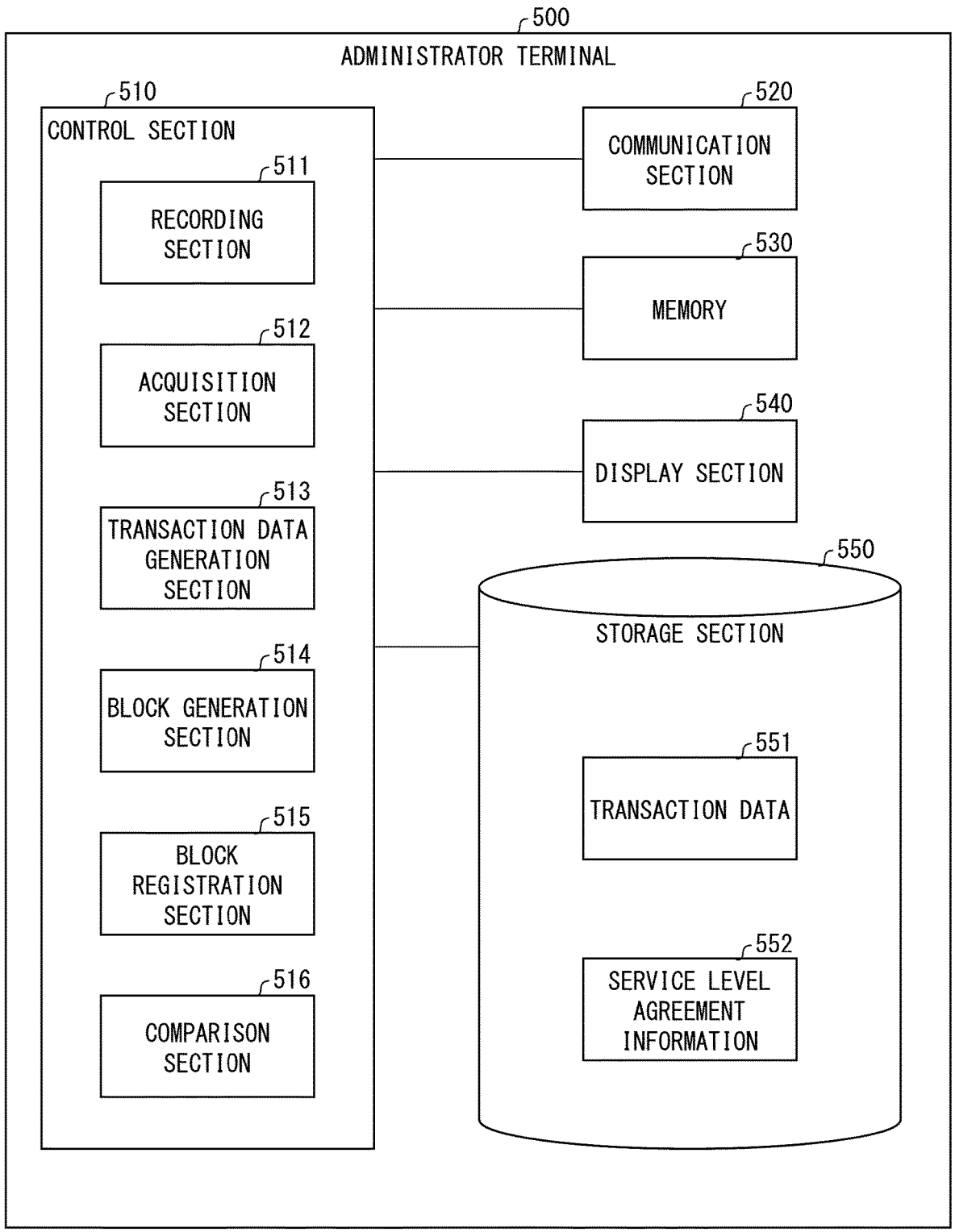
FIG. 17 is a block diagram illustrating a configuration example of a terminal of an administrator according to the fourth example embodiment.

FIG. 17 is a block diagram illustrating a configuration example of an administrator terminal 500 (which is an example of the terminal e3) according to the present example embodiment. As illustrated in FIG. 17, the terminal 500 includes a control section 510, a communication section 520, a memory 530, a display section 540, and a storage section 550. The control section 510 comprehensively controls the entire terminal 500. The communication section 520 communicates with an external apparatus. The memory 530 stores a program and various kinds of data which are used by the control section 510. The display section 540 displays, for example, a result of comparison by a comparison section 516 (described later). The storage section 550 stores transaction data 551 generated by a transaction data generation section 513 (described later), service level agreement information 552 acquired by an acquisition section 512 (described later) via the communication section 520, and the like.

The following description will discuss details of the control section 510. The control section 510 includes a recording section 511, an acquisition section 512, a transaction data generation section 513, a block generation section 514, a block registration section 515, and a comparison section 516. Among these, the recording section 511, the transaction data generation section 513, the block generation section 514, and the block registration section 515 are similar to the recording section 411, the transaction data generation section 413, the block generation section 414, and the block registration section 415, respectively, which have been described in the third example embodiment. The acquisition section 512 acquires transaction data 551 via the communication section 520. The acquisition section 512 acquires, via the communication section 520, service level agreement information 552 pertaining to the service. The service level agreement information is acquired from, for example, the service database e6. The comparison section 516 compares log information included in the transaction data 551 with the service level agreement information 552, and outputs a comparison result. The comparison result is displayed on the display section 540. The acquisition section 512 is an embodiment of the "second acquisition means" recited in claims. The comparison section 516 is an embodiment of the "comparison means" recited in claims.

In the present example embodiment, the configuration of the terminal has been described with reference to the administrator terminal 500 as an example. Note, however, that the acquisition section 512 and the comparison section 516 can also be provided in the terminal of each end user.

Figure 18:
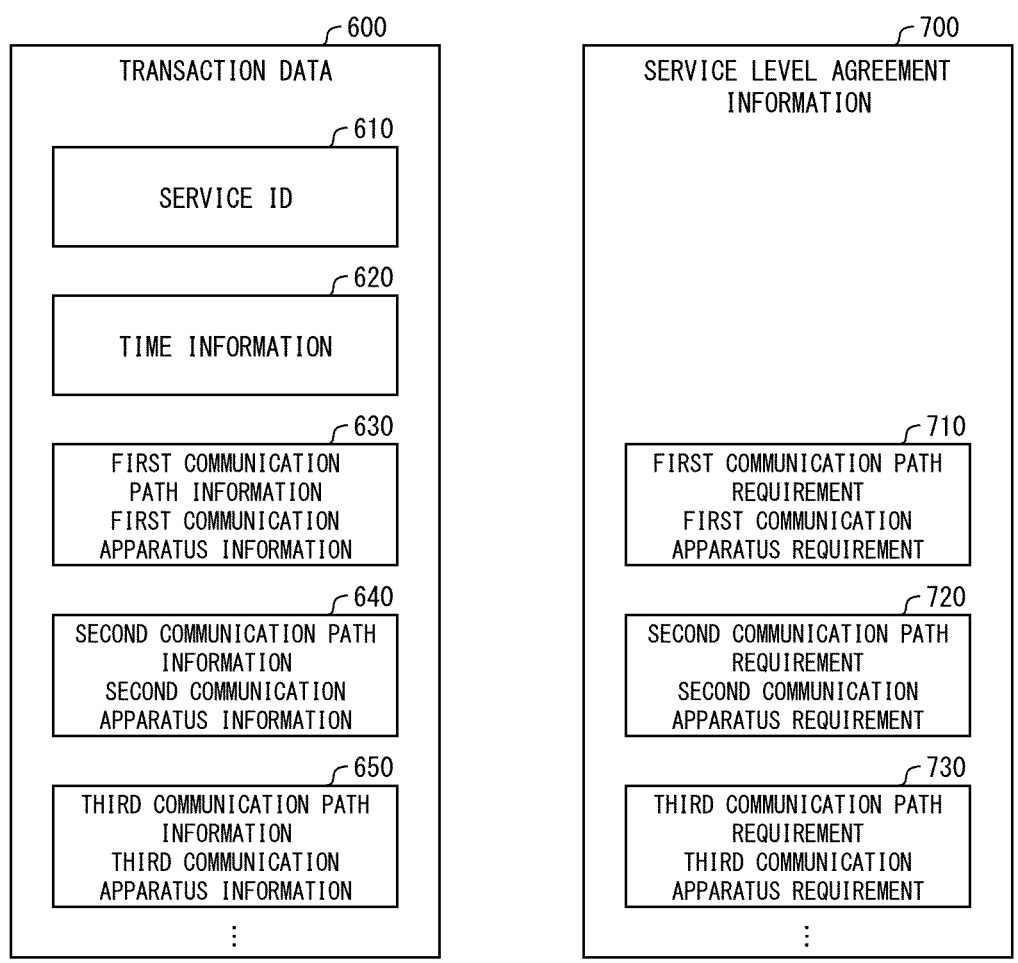
FIG. 18 is a diagram illustrating an example of data that is included in transaction data and service level agreement information.

FIG. 18 is a diagram illustrating an example of data that is included in transaction data 551 and service level agreement information 552. As illustrated in FIG. 18, transaction data 600 (which is an example of the transaction data 551) includes a service ID 610, time information 620, first communication path information and first communication apparatus information (collectively, referred to as first communication-related information) 630, second communication path information and second communication apparatus information (collectively, referred to as second communication-related information) 640, third communication path information and third communication apparatus information (collectively, third communication-related information) 650, and so forth. The pieces of communication-related information are each communication-related information which is recorded and owned by an operator involved in provision of the service.

Service level agreement information 700 (which is an example of the service level agreement information 552) includes a first communication path requirement and a first communication apparatus requirement (collectively, referred to as a first communication-related requirement) 710, a second communication path requirement and a second communication apparatus requirement (collectively, referred to as a second communication-related requirement) 720, a third communication path requirement and a third communication apparatus requirement (collectively, referred to as a third communication-related requirement) 730, and so forth. The communication-related requirements are each a quality requirement for communication that is presented or guaranteed by an operator involved in provision of the service. Note that the service level agreement information 700 may include a service ID.

Figure 19:
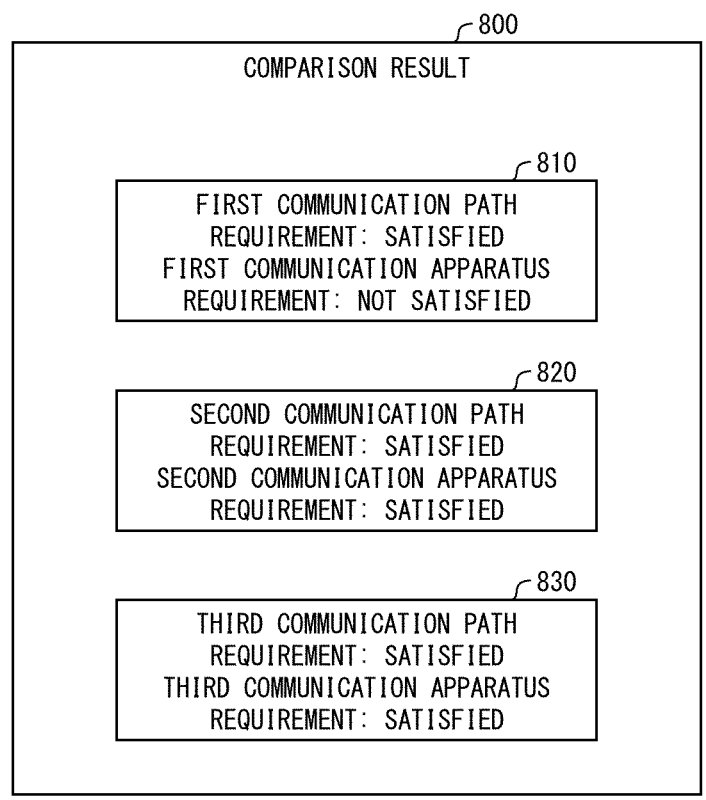
FIG. 19 illustrates an example of a screen that is displayed on a display section and that indicates a result of comparison carried out by a comparison section.

FIG. 19 illustrates an example of a screen that is displayed on the display section 540 and that indicates a result of comparison carried out by the comparison section 516. A screen 800 for displaying the comparison result displays a first comparison result 810, a second comparison result 820, and a third comparison result 830. This screen 800 illustrates a display example in which a service is provided using communication infrastructures owned by three telecommunications carriers. The first comparison result 810 is a comparison result for a communication infrastructure owned by a first telecommunications carrier. Similarly, the second comparison result 820 is a comparison result for a communication infrastructure owned by a second telecommunications carrier. The third comparison result 830 is a comparison result for a communication infrastructure owned by a third telecommunications carrier.

In the example illustrated in FIG. 19, it is displayed that communication carried out using the communication infrastructure of the first telecommunications carrier satisfies a communication path requirement (e.g., communication capacity, communication rate, and the like of the communication path) but does not satisfy a communication apparatus requirement (e.g., connection time, transfer rate, and the like of the communication apparatus). Moreover, it is displayed that both the requirements are satisfied for the communication infrastructures of the second telecommunications carrier and the third telecommunications carrier.

Next, the following description will discuss a flow of a comparison and output method which is carried out by the administrator terminal 500 and in which log information is compared with service level agreement information, and the comparison result is output. Note that it is necessary to compare log information with service level agreement information in a case where, for example, a defect occurs in a service provided by a service provider, and the defect may be caused due to a defect in a communication infrastructure owned by a telecommunications carrier.

Figure 20:
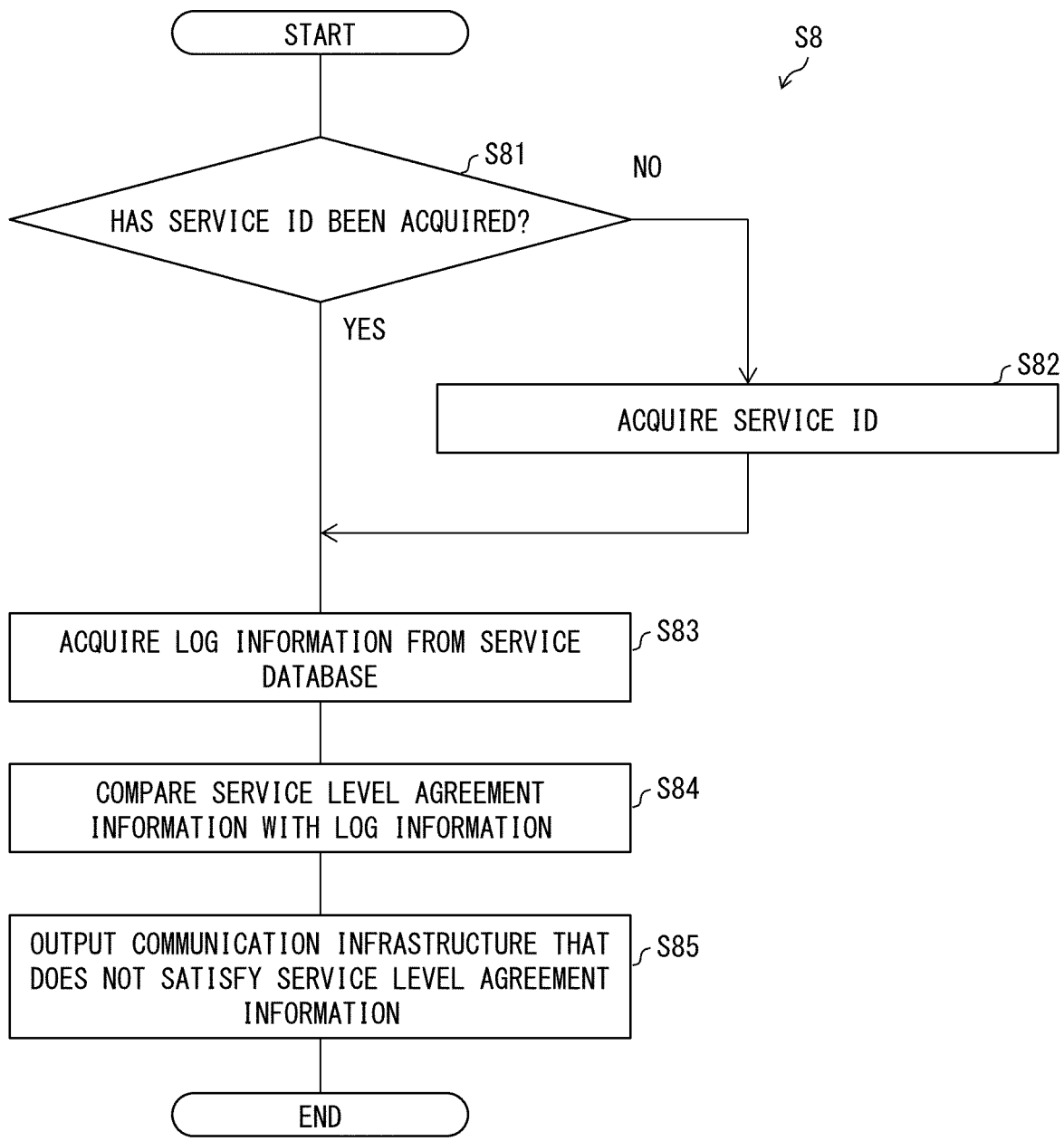
FIG. 20 is a flowchart illustrating a flow of a comparison and output method in which log information is compared with service level agreement information, and a comparison result is output.

FIG. 20 is a flowchart illustrating a flow S8 of a comparison and output method. As illustrated in FIG. 20, first, in step S81, the control section 510 determines whether or not a service ID of a service in which a defect occurred has been acquired. In a case where it is determined that the service ID has been acquired (step S81: Y), the process proceeds to step S83. Meanwhile, in a case where it is determined that the service ID has not been acquired (step S81: N), the process proceeds to step S82. In step S82, the acquisition section 512 acquires, via the communication section 520, the service ID of the service recorded in the block chain. Then, the flow proceeds to step S83.

In step S83, the acquisition section 512 accesses the service database e6 to acquire log information that is associated with the service ID. The log information that is acquired includes communication-related information. Next, in step S84, the comparison section 516 compares the service level agreement information with the acquired log information. The service level agreement information can be acquired from the service database e6 in a case where the service level agreement information is stored in the service database e6 in association with the service ID. Alternatively, in a case where the service level agreement information is recorded in transaction data in the block chain, the service level agreement information may be acquired from the transaction data.

Next, in step S85, the comparison section 516 outputs a communication infrastructure that does not satisfy the service level agreement information. The display section 540 displays information output from the comparison section 516. For example, the display section 540 displays comparison results of all of involved communication infrastructures, as illustrated in FIG. 19. Alternatively, the comparison section 516 may output only a communication infrastructure that does not satisfy the service level agreement information. Note that the outputting method and the method of displaying the output information are not limited to the above example.

As described above, in a case where log information is stored in the service database e6 in association with a service ID, it is not necessary to record the log information in a block chain of an end user terminal. Therefore, it is possible to reduce a data amount of a block chain that is to be recorded in the end user terminal. In a case where service level agreement information is stored in the service database e6 in association with a service ID, it is not necessary to record the service level agreement information in a block chain of an end user terminal. Therefore, it is possible to further reduce an amount of data to be recorded.

As described above, according to the configuration of the fourth example embodiment, the comparison section 516 can compare log information with service level agreement information and output a comparison result. Each of end users can confirm, from the comparison result, a communication infrastructure in which a defect has occurred.

Therefore, according to the configuration of the fourth example embodiment, it is possible to bring about an effect in which, in a case where a defect has occurred in a service, it is possible to display where in a communication infrastructure the defect has occurred so that end users can confirm it, in addition to an effect of allowing end users to share transaction data registered in a block chain.

[Software Implementation Example]

The functions of part of or all of the information processing apparatus 1, the information processing system 6, and the like, or the acquisition section 11, the transaction data acquisition section 21, the first acquisition section 31, the second acquisition section 32, the generation section 12, the transaction data generation section 113, the block generation section 213, the log information generation section 313, the registration section 22, the block registration section 214, the comparison section 33, the control section 210, the recording section 411, and the like which are included in the information processing apparatus and the information processing system (hereinafter, referred to as "information processing apparatus and the like") can be realized by hardware such as an integrated circuit (IC chip) or can be alternatively realized by software.

Figure 21:
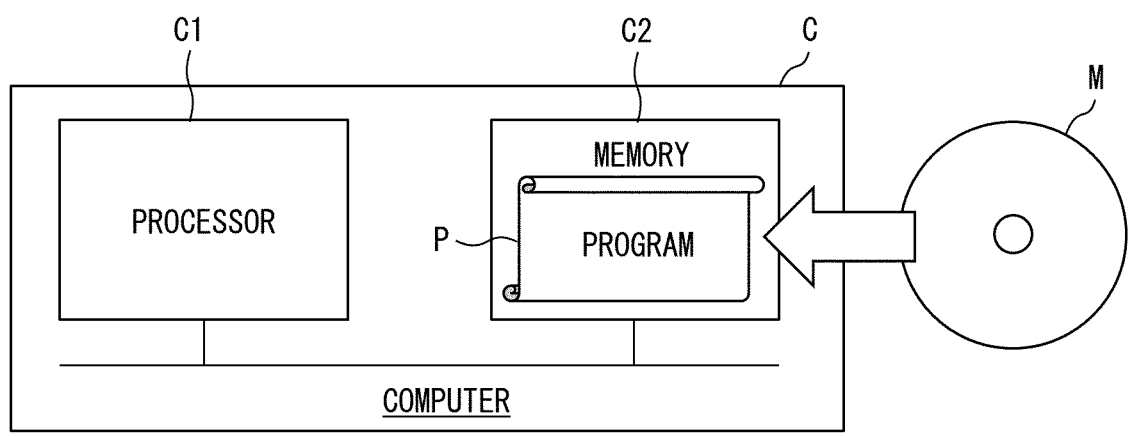
FIG. 21 is a diagram illustrating a configuration in which the components are constituted by software.

In the latter case, each of the information processing apparatus and the like is realized by, for example, a computer that executes instructions of a program that is software realizing the foregoing functions. FIG. 21 illustrates an example of such a computer (hereinafter, referred to as "computer C"). The computer C includes at least one processor C1 and at least one memory C2. The memory C2 stores a program P for causing the computer C to function as the information processing apparatus and the like. In the computer C, the processor C1 reads the program P from the memory C2 and executes the program P, so that the functions of the information processing apparatus and the like are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

[Additional Remark 1]

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

[Additional Remark 2]

Some of or all of the foregoing example embodiments can also be described as below. Note, however, that the present invention is not limited to the following supplementary notes.

(Supplementary Note 1)

An information processing apparatus, including: an acquisition means that acquires log information of one or more communication infrastructures which constitute an end-to-end communication path; and a generation means that generates transaction data which includes the log information and which is to be added to a block chain updated using a predetermined consensus algorithm.

According to the configuration, it is possible to provide a technique that allows persons concerned with provision of a service to share information pertaining to a communication infrastructure which has been used to provide the service.

(Supplementary Note 2)

The information processing apparatus according to supplementary note 1, further including a registration means that registers the transaction data in the block chain.

According to the configuration, it is possible to register transaction data in a block chain.

(Supplementary Note 3)

The information processing apparatus according to supplementary note 1 or 2, in which: the log information is log information of the one or more communication infrastructures which have been used to provide a certain service; and the generation means associates the transaction data with a service ID that identifies the certain service.

According to the configuration, it is possible to identify transaction data based on a service ID.

(Supplementary Note 4)

The information processing apparatus according to supplementary note 3, in which: the generation means includes the service ID in the transaction data.

According to the configuration, it is possible to acquire log information from a service ID that is included in transaction data.

(Supplementary Note 5)

The information processing apparatus according to supplementary note 3 or 4, in which: the generation means includes, in the transaction data, time information as the log information, the time information identifying a time at which the certain service is provided.

According to the configuration, it is possible to acquire a service provision time from transaction data.

(Supplementary Note 6)

The information processing apparatus according to any one of supplementary notes 3 through 5, in which: the generation means includes, in the transaction data, at least one of communication path information and communication apparatus information as the log information, the communication path information indicating a state of a communication path which has been used to provide the certain service, and the communication apparatus information indicating a state of a communication apparatus which has been used to provide the certain service.

According to the configuration, it is possible to acquire at least one of communication path information and communication apparatus information from transaction data.

(Supplementary Note 7)

The information processing apparatus according to any one of supplementary notes 3 through 6, in which: the generation means includes, in the transaction data, at least one of a communication path ID and a communication apparatus ID as the log information, the communication path ID being used to identify a communication path which has been used to provide the certain service, and the communication apparatus ID being used to identify a communication apparatus which has been used to provide the certain service.

According to the configuration, it is possible to identify, from transaction data, a communication path and a communication apparatus which have been used to provide a service.

(Supplementary Note 8)

The information processing apparatus according to any one of supplementary notes 3 through 7, further including: a second acquisition means that acquires service level agreement information pertaining to the certain service; and a comparison means that compares the log information with the service level agreement information and outputs a comparison result.

According to the configuration, it is possible for persons concerned with provision of a service to acquire a result of comparison of log information with service level agreement information, and the persons concerned can verify a cause of occurrence of a defect.

(Supplementary Note 9)

An information processing apparatus, including: a first acquisition means that acquires, from transaction data identified by a certain service ID, log information of one or more communication infrastructures which have been used to provide a service identified by the certain service ID, the transaction data being registered in a block chain updated using a predetermined consensus algorithm; a second acquisition means that acquires service level agreement information pertaining to the service identified by the certain service ID; and a comparison means that compares the log information with the service level agreement information and outputs a comparison result.

According to the configuration, it is possible to provide a technique that allows persons concerned with provision of a service to share information pertaining to a communication infrastructure which has been used to provide the service.

(Supplementary Note 10)

An information processing system, including: an acquisition means that acquires log information of one or more communication infrastructures which constitute an end-to-end communication path; a generation means that generates transaction data which includes the log information and which is to be added to a block chain updated using a predetermined consensus algorithm; and a registration means that registers the transaction data in the block chain.

According to the configuration, it is possible to provide a technique that allows persons concerned with provision of a service to share information pertaining to a communication infrastructure which has been used to provide the service.

(Supplementary Note 11)

The information processing system according to supplementary note 10, in which: the transaction data is transaction data of a service identified by a certain service ID; the information processing system further includes a second acquisition means that acquires service level agreement information pertaining to the service; and the information processing system further includes a comparison means that compares the log information with the service level agreement information and outputs a comparison result.

According to the configuration, it is possible to provide a technique that allows persons concerned with provision of a service to share information pertaining to a communication infrastructure which has been used to provide the service.

(Supplementary Note 12)

An information processing method, including: acquiring log information of one or more communication infrastructures which constitute an end-to-end communication path; and generating transaction data which includes the log information and which is to be added to a block chain updated using a predetermined consensus algorithm.

According to the configuration, it is possible to provide a technique that allows persons concerned with provision of a service to share information pertaining to a communication infrastructure which has been used to provide the service.

(Supplementary Note 13)

An information processing method, including: acquiring, from transaction data identified by a certain service ID, log information of one or more communication infrastructures which have been used to provide a service identified by the certain service ID, the transaction data being registered in a block chain updated using a predetermined consensus algorithm; acquiring service level agreement information pertaining to the service identified by the certain service ID; and comparing the log information with the service level agreement information and outputting a comparison result.

According to the configuration, it is possible to provide a technique that allows persons concerned with provision of a service to share information pertaining to a communication infrastructure which has been used to provide the service.

(Supplementary Note 14)

A program for causing a computer to function as: an acquisition means that acquires log information of one or more communication infrastructures which constitute an end-to-end communication path; and a generation means that generates transaction data which includes the log information and which is to be added to a block chain updated using a predetermined consensus algorithm.

According to the configuration, it is possible to provide a technique that allows persons concerned with provision of a service to share information pertaining to a communication infrastructure which has been used to provide the service.

(Supplementary Note 15)

A program for causing a computer to function as: a first acquisition means that acquires, from transaction data identified by a certain service ID, log information of one or more communication infrastructures which have been used to provide a service identified by the certain service ID, the transaction data being registered in a block chain updated using a predetermined consensus algorithm; a second acquisition means that acquires service level agreement information pertaining to the service identified by the certain service ID; and a comparison means that compares the log information with the service level agreement information and outputs a comparison result.

According to the configuration, it is possible to provide a technique that allows persons concerned with provision of a service to share information pertaining to a communication infrastructure which has been used to provide the service.

The program can be stored in a computer-readable non-transitory tangible storage medium.

(Supplementary Note 16)

An information processing apparatus, including: a transaction data acquisition means that acquires transaction data which includes log information of one or more communication infrastructures which constitute an end-to-end communication path, the transaction data being added to a block chain updated using a predetermined consensus algorithm; and a registration means that registers the transaction data in the block chain.

According to the configuration, it is possible to provide a technique that allows persons concerned with provision of a service to share information pertaining to a communication infrastructure which has been used to provide the service.

(Supplementary Note 17)

An information processing method, including: acquiring transaction data which includes log information of one or more communication infrastructures which constitute an end-to-end communication path, the transaction data being added to a block chain updated using a predetermined consensus algorithm; and registering the transaction data in the block chain.

According to the configuration, it is possible to provide a technique that allows persons concerned with provision of a service to share information pertaining to a communication infrastructure which has been used to provide the service.

(Supplementary Note 18)

A program for causing a computer to function as: an acquisition means that acquires transaction data which includes log information of one or more communication infrastructures which constitute an end-to-end communication path, the transaction data being added to a block chain updated using a predetermined consensus algorithm; and a registration means that registers the transaction data in the block chain.

According to the configuration, it is possible to provide a technique that allows persons concerned with provision of a service to share information pertaining to a communication infrastructure which has been used to provide the service.

[Additional Remark 3]

Furthermore, some of or all of the foregoing example embodiments can also be expressed as below.

An information processing apparatus including at least one processor, the at least one processor carrying out: an acquisition process of acquiring log information of one or more communication infrastructures which constitute an end-to-end communication path; and a generation process of generating transaction data which includes the log information and which is to be added to a block chain updated using a predetermined consensus algorithm.

Note that the information processing apparatus can further include a memory. The memory can store a program for causing the processor to carry out the first acquisition process, the acquisition process, and the generation process.

REFERENCE SIGNS LIST 1, 2, 3: Information processing apparatus
6: Information processing system
11, 112, 212, 312, 412, 512, 611: Acquisition section
21: Transaction data acquisition section
31: First acquisition section
32: Second acquisition section
12, 621: Generation section
113, 413, 513: Transaction data generation section
213, 414: Block generation section
313: Log information generation section
22, 631: Registration section
214, 415, 514: Block registration section
33, 516: Comparison section
120, 220, 320: Communication section
130, 230, 330: Memory
140, 240, 340: Storage section
210, 313, 410, 510: Control section
411, 511: Recording section

What is claimed is:

1. An information processing apparatus, comprising at least one processor, the at least one processor carrying out:
an acquisition process of acquiring log information of one or more communication infrastructures which constitute an end-to-end communication path; and
a generation process of generating transaction data which includes the log information and which is to be added to a block chain updated using a predetermined consensus algorithm,
wherein:
the log information is log information of the one or more communication infrastructures which have been used to provide a certain service,
in the generation process, the transaction data is associated with a service ID that identifies the certain service, and
in the generation process, at least one of communication path information and communication apparatus information is included in the transaction data as the log information, the communication path information indicating a state of a communication path which has been used to provide the certain service, and the communication apparatus information indicating a state of a communication apparatus which has been used to provide the certain service.

2. The information processing apparatus according to claim 1, wherein:
the at least one processor further carries out a registration process of registering the transaction data in the block chain.

3. The information processing apparatus according to claim 1, wherein:
in the generation process, the service ID is included in the transaction data.

4. The information processing apparatus according to claim 1, wherein:
in the generation process, time information is included in the transaction data as the log information, the time information identifying a time at which the certain service is provided.

5. The information processing apparatus according to claim 1, wherein:
in the generation process, at least one of a communication path ID and a communication apparatus ID is included in the transaction data as the log information, the communication path ID being used to identify a communication path which has been used to provide the certain service, and the communication apparatus ID being used to identify a communication apparatus which has been used to provide the certain service.

6. The information processing apparatus according to claim 1, wherein the at least one processor further carries out:
a second acquisition process of acquiring service level agreement information pertaining to the certain service; and
a comparison process of comparing the log information with the service level agreement information and outputs a comparison result.

7. An information processing method, comprising:
acquiring, by at least one processor, log information of one or more communication infrastructures which constitute an end-to-end communication path; and
generating, by the at least one processor, transaction data which includes the log information and which is to be added to a block chain updated using a predetermined consensus algorithm,
wherein:
the log information is log information of the one or more communication infrastructures which have been used to provide a certain service,
in the generating, the transaction data is associated with a service ID that identifies the certain service, and
in the generating, at least one of communication path information and communication apparatus information is included in the transaction data as the log information, the communication path information indicating a state of a communication path which has been used to provide the certain service, and the communication apparatus information indicating a state of a communication apparatus which has been used to provide the certain service.

8. A computer-readable non-transitory storage medium storing a program for causing a computer to function as:
- an acquisition unit that acquires log information of one or more communication infrastructures which constitute an end-to-end communication path; and
- a generator that generates transaction data which includes the log information and which is to be added to a block chain updated using a predetermined consensus algorithm, wherein:
- the log information is log information of the one or more communication infrastructures which have been used to provide a certain service,
- in the generation, the transaction data is associated with a service ID that identifies the certain service, and
- in the generation, at least one of communication path information and communication apparatus information is included in the transaction data as the log information, the communication path information indicating a state of a communication path which has been used to provide the certain service, and the communication apparatus information indicating a state of a communication apparatus which has been used to provide the certain service.

* * * * *